United States Patent
Miwa et al.

(10) Patent No.: US 8,238,040 B2
(45) Date of Patent: Aug. 7, 2012

(54) ZOOM OPTICAL SYSTEM, OPTICAL APPARATUS EQUIPPED WITH ZOOM OPTICAL SYSTEM AND METHOD FOR MANUFACTURING ZOOM OPTICAL SYSTEM

(75) Inventors: Satoshi Miwa, Yokohama (JP); Takeshi Suzuki, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/954,669

(22) Filed: Nov. 25, 2010

(65) Prior Publication Data
US 2011/0122508 A1    May 26, 2011

(30) Foreign Application Priority Data
Nov. 26, 2009   (JP) .................................. 2009-268499

(51) Int. Cl.
*G02B 15/14* (2006.01)
*G02B 27/64* (2006.01)
(52) U.S. Cl. ........................ 359/687; 359/554; 359/557
(58) Field of Classification Search .................. 359/676, 359/683, 687, 554, 557
See application file for complete search history.

(56) References Cited

U.S. PATENT DOCUMENTS

| 5,585,969 | A | 12/1996 | Endo |
| 7,136,231 | B2 | 11/2006 | Ito et al. |
| 2005/0083584 | A1 | 4/2005 | Ito et al. |
| 2011/0222169 | A1* | 9/2011 | Sudoh ........................... 359/687 |

FOREIGN PATENT DOCUMENTS

| JP | 07-151970 A | 6/1995 |
| JP | 2003-140048 A | 5/2003 |
| JP | 2003-140048 A | 5/2003 |
| JP | 2004-258509 A | 9/2004 |

* cited by examiner

*Primary Examiner* — Scott J Sugarman
(74) *Attorney, Agent, or Firm* — Miles & Stockbridge P.C.

(57) ABSTRACT

A zoom optical system including, in order from an object side: a first group having positive power; a second group having negative power; a third group having positive power; and a fourth group having positive power, at least a portion of lenses within said third group composing a movable group which moves in a direction having a component perpendicular to an optical axis, a distance between said first group and said second group, a distance between said second group and said third group and a distance between said third group and said fourth group being variable upon zooming from a wide-angle end state to a telescopic end state, thereby providing a zoom optical system capable of correcting a camera shake by the movable group with realizing high optical performance, a high zoom ratio, and a small f-number, an optical apparatus equipped therewith, and a method for manufacturing thereof.

24 Claims, 18 Drawing Sheets

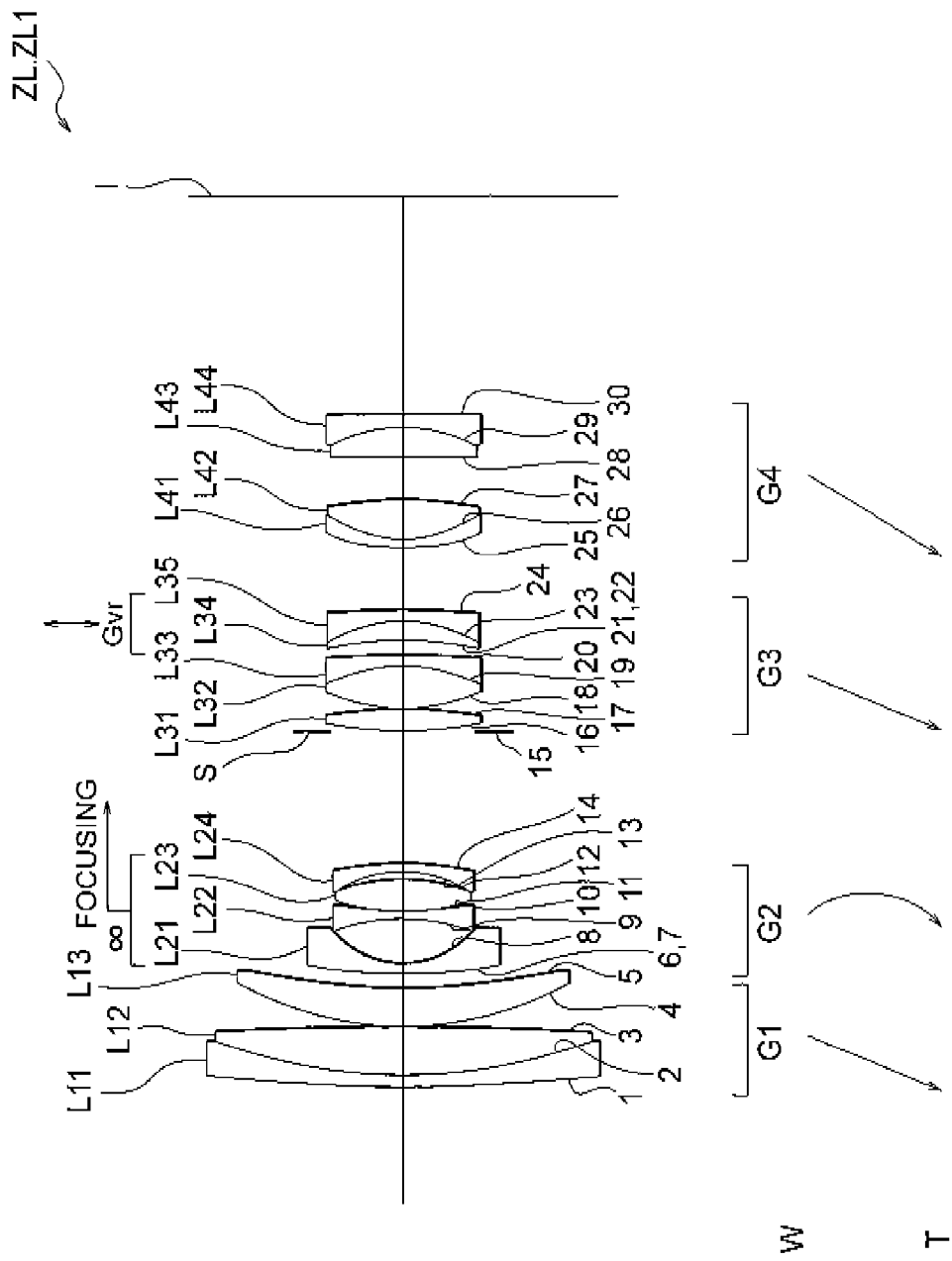

FIG. 8A
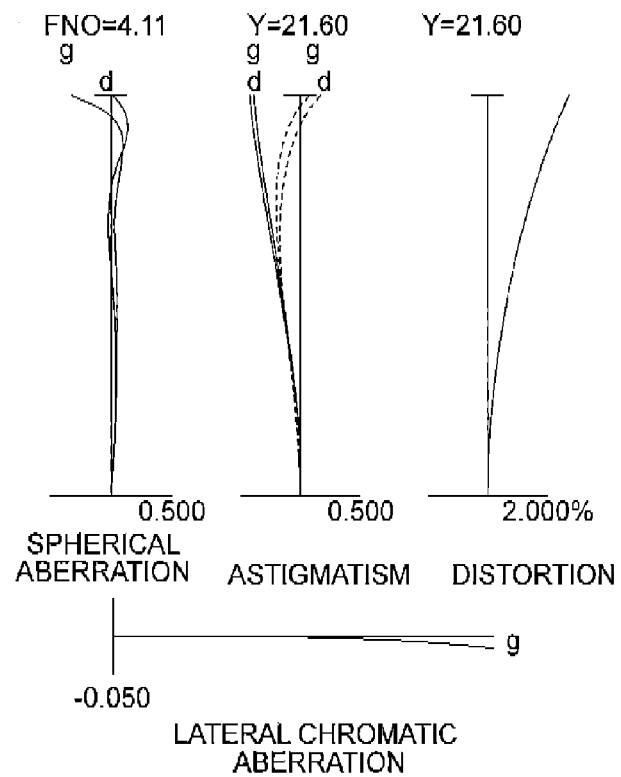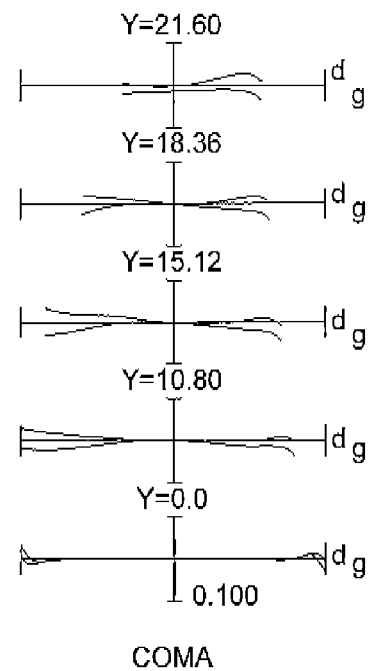
FIG. 8B
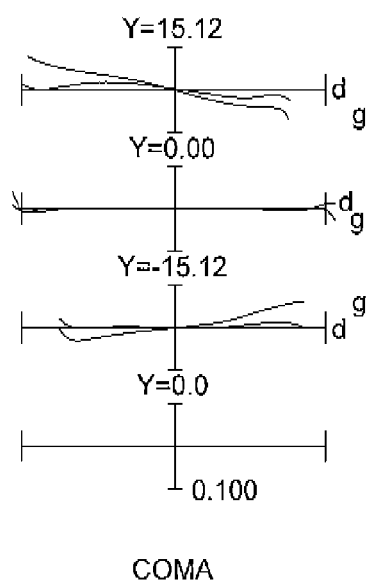

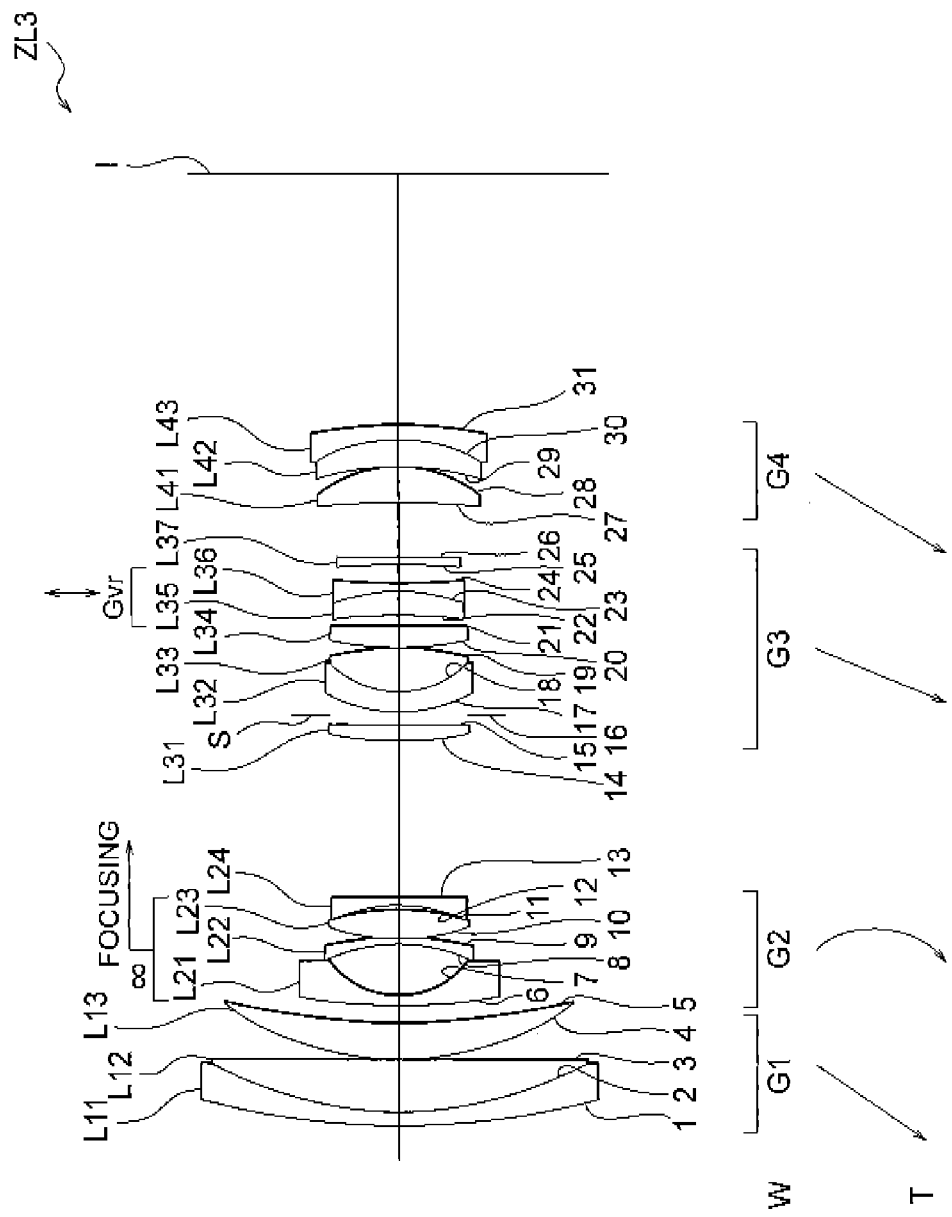

ZOOM OPTICAL SYSTEM, OPTICAL APPARATUS EQUIPPED WITH ZOOM OPTICAL SYSTEM AND METHOD FOR MANUFACTURING ZOOM OPTICAL SYSTEM

The disclosure of the following priority application is herein incorporated by reference:

Japanese Patent Application No. 2009-268499 filed on Nov. 26, 2009.

BACKGROUND OF THE INVENTION

1. Field of the Invention

The present invention relates to a zoom optical system, an optical apparatus equipped with the zoom optical system, and a method for manufacturing the zoom optical system.

2. Related Background Art

A zoom optical system suited to a film camera, an electronic still camera, a video camera, etc, has hitherto been proposed (refer to, e.g., Japanese Patent Laid-Open Publication No. 2003-140048).

A zoom lens having a vibration (a camera shake) reduction function has, however, a tendency of having a comparatively large number of lenses configuring an optical system and of deteriorating its compactness in terms of an entire length and an outside diameter of a lens barrel. Further, if schemed to increase a zoom ratio while having the vibration reduction function, a remarkable deterioration of the optical performance increases, resulting in unsatisfactory optical performance.

SUMMARY OF THE INVENTION

It is an object of the present invention, which was devised in view of the problems described above, to provide a zoom optical system including an image-shift-enabled optical system which can correct a camera shake and exhibiting high performance with a small F-number (bright lens) as well as exhibiting a high zoom ratio.

To accomplish the above object, according to a first mode of the present invention, there is provided a zoom optical system comprising, in order from an object side: a first lens group having positive refractive power; a second lens group having negative refractive power; a third lens group having positive refractive power; and a fourth lens group having positive refractive power; at least a portion of lenses within said third lens group composing a movable lens group which moves in a direction having a component perpendicular to an optical axis, upon zooming from a wide-angle end state to a telescopic end state, a distance between said first lens group and said second lens group, a distance between said second lens group and said third lens group and a distance between said third lens group and said fourth lens group being variable, and the following conditional expressions (1) and (2) being satisfied:

$$0.47 < \phi3/f3 < 1.00 \tag{1}$$

$$4.50 < f1/(-f2) < 8.50 \tag{2}$$

where φ3 denotes a light beam effective diameter of a lens surface positioned closest to the object side of said third lens group, f1 denotes a focal length of said first lens group, f2 denotes a focal length of said second lens group, and f3 denotes a focal length of said third lens group.

According to a second aspect of the present invention, there is provided an optical apparatus including said zoom optical system according to the first aspect.

According to a third aspect of the present invention, there is provided a zoom optical system comprising, in order from an object side: a first lens group having positive refractive power; a second lens group having negative refractive power; a third lens group having positive refractive power; and a fourth lens group having positive refractive power; at least a portion of lenses within said third lens group composing a movable lens group which moves in a direction having a component perpendicular to an optical axis, upon zooming from a wide-angle end state to a telescopic end state, a distance between said first lens group and said second lens group, a distance between said second lens group and said third lens group and a distance between said third lens group and said fourth lens group being variable, and the following conditional expressions (3) and (2) being satisfied:

$$0.50 < \phi3/Bfw < 0.85 \tag{3}$$

$$4.50 < f1/(-f2) < 8.50 \tag{2}$$

when φ3 denotes a light beam effective diameter of a lens surface positioned closest to the object side of said third lens group, f1 denotes a focal length of said first lens group, f2 denotes a focal length of said second lens group, and Bfw denotes a back focal length of the zoom optical system in the wide-angle end state.

According to a fourth aspect of the present invention, there is provided a method for manufacturing a zoom optical system comprising, in order from an object side, a first lens group, a second lens group, a third lens group, and a fourth lens group; the method comprising steps of disposing at least a portion of lenses composing a movable lens group which moves in a direction having a component perpendicular to an optical axis into said third lens group; varying a distance between said first lens group and said second lens group, a distance between said second lens group and said third lens group and a distance between said third lens group and said fourth lens group upon zooming from a wide-angle end state to a telescopic end state; and disposing the first lens group having positive refractive power, the second lens group having negative refractive power, a third lens group having positive refractive power and a fourth lens group having positive refractive power with satisfying the following conditional expressions (1) and (2):

$$0.47 < \phi3/f3 < 1.00 \tag{1}$$

$$4.50 < f1/(-f2) < 8.50 \tag{2}$$

when φ3 denotes a light beam effective diameter of a lens surface positioned closest to the object side of said third lens group, f1 denotes a focal length of said first lens group, f2 denotes a focal length of said second lens group, and f3 denotes a focal length of said third lens group.

According to a fifth aspect of the present invention, there is provided a method for manufacturing a zoom optical system comprising, in order from an object side, a first lens group, a second lens group, a third lens group, and a fourth lens group; the method comprising steps of: disposing at least a portion of lenses composing a movable lens group which moves in a direction having a component perpendicular to an optical axis into said third lens group; varying a distance between said first lens group and said second lens group, a distance between said second lens group and said third lens group and a distance between said third lens group and said fourth lens group upon zooming from a wide-angle end state to a telescopic end state; and disposing the first lens group having positive refractive power, the second lens group having negative refractive power, a third lens group having positive refractive power and a fourth lens group having positive refractive power with satisfying the following conditional expressions (3) and (2):

$$0.50 < \phi 3/Bfw < 0.85 \quad (3)$$

$$4.50 < f1/(-f2) < 8.50 \quad (2)$$

when φ3 denotes a light beam effective diameter of a lens surface positioned closest to the object side of said third lens group, f1 denotes a focal length of said first lens group, f2 denotes a focal length of said second lens group, and Bfw denotes a back focal length of the zoom optical system in the wide-angle end state.

In the case of configuring in the way described above the zoom optical system, the optical apparatus including the zoom optical system and a method for manufacturing the zoom optical system according to the present invention, it is feasible to correct the camera shake by an image-shift-enabled optical system and to exhibit high optical performance with a small F-number as well as to exhibit a high zoom ratio.

BRIEF DESCRIPTION OF THE DRAWINGS

FIG. 1 is a sectional view showing a configuration of a zoom optical system according to Example 1.

FIG. 2A is a diagram of the various aberrations in a wide-angle end state; and FIG. 2B is a diagram of a coma when correcting a rotational vibration through 0.52° in an infinite-distance photographing state in the wide-angle end state.

FIG. 4A is the diagram of the various aberrations in the telephoto end state; FIG. 4B is a diagram of coma when correcting a rotational vibration through 0.20° in the infinite-distance photographing state in the telephoto end state.

FIG. 6A is the diagram of the various aberrations in the wide-angle end state; FIG. 6B is a diagram of coma when correcting the rotational vibration through 0.64° in the infinite-distance photographing state in the wide-angle end state.

FIGS. 8A and 8B are diagrams of the various aberrations in the infinite-distance focusing state according to Example 2; FIG. 8A is the diagram of the various aberrations in the telephoto end state; FIG. 8B is a diagram of coma when correcting the rotational vibration through 0.34° in the infinite-distance photographing state in the telephoto end state.

FIG. 9 is a sectional view showing a configuration of the zoom optical system according to Example 3.

FIG. 10A is the diagram of the various aberrations in the wide-angle end state; FIG. 10B is a diagram of coma when correcting the rotational vibration through 0.66° in the infinite-distance photographing state in the wide-angle end state.

FIG. 12A is the diagram of the various aberrations in the telephoto end state; FIG. 12B is a diagram of coma when correcting the rotational vibration through 0.19° in the infinite-distance photographing state in the telephoto end state.

FIG. 14A is the diagram of the various aberrations in the wide-angle end state; FIG. 14B is a diagram of coma when correcting the rotational vibration through 0.68° in the infinite-distance photographing state in the wide-angle end state.

FIG. 16A is the diagram of the various aberrations in the telephoto end state; FIG. 16B is a diagram of coma when correcting the rotational vibration through 0.21° in the infinite-distance photographing state in the telephoto end state.

DESCRIPTION OF THE MOST PREFERRED EMBODIMENT

Figure 2A:
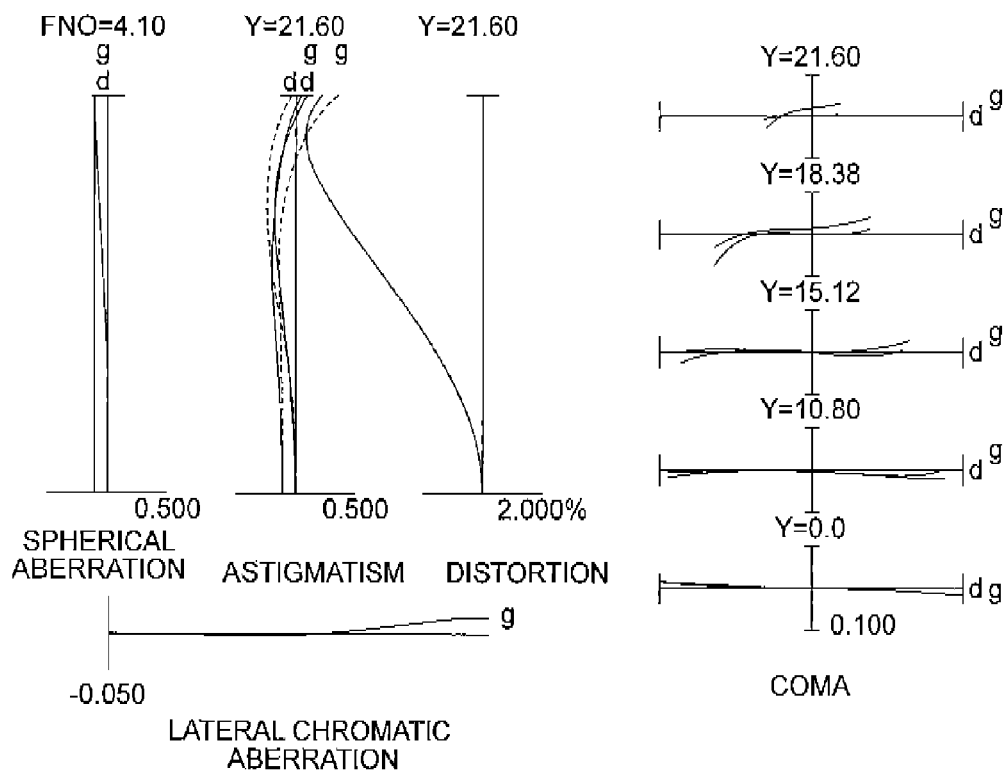
FIGS. 2A and 2B are diagrams of various aberrations in an infinite-distance focusing state in Example 1.

An exemplary embodiment of the present application will hereinafter be described with reference to the drawings. To start with, a zoom optical system ZL according to the present embodiment is constructed by including, as shown in FIG. 1, in order from an object side, a first lens group G1 having positive refractive power, a second lens group G2 having negative refractive power, a third lens group G3 having positive refractive power and a fourth lens group G4 having positive refractive power, Then, at least a portion of lenses within the third lens group G3 configures a movable lens group Gvr which shifts so as to have a component in a direction perpendicular to an optical axis. This configuration enables the optical system exhibiting preferable performance to be acquired while securing a given zoom ratio. A conditional expression for configuring the zoom optical system ZL according to the present embodiment will hereinafter be described.

To begin with, it is desirable that the zoom optical system ZL according to the present embodiment satisfies, when φ3 is defined as a light beam effective diameter of a lens surface, positioned closest to the object side, of the third lens group G3 and f3 is defined as a focal length of the third lens group G3, the following conditional expression (1):

$$0.47 < \phi 3/f3 < 1.00 \quad (1).$$

Conditional expression (1) specifies refractive power of the third lens group G3 with respect to the light beam effective diameter of the lens surface positioned closest to the object side of the third lens group G3. The zoom optical system ZL in the present embodiment can realize the preferable optical performance and can secure the predetermined zoom ratio by satisfying conditional expression (1). When the value φ3/f3 is equal to or exceeds the upper limit value of conditional expression (1), refractive power of the third lens group G3 increases, and a coma in a telephoto end state is hard to be corrected, which is an undesirable aspect. It should be noted that the upper limit value in conditional expression (1) is, it is preferable, set to 0.80 in terms of securing the effect of the present embodiment, which enables refractive power of the third lens group G3 to be properly set and coma to be further reduced especially when zooming. When the value φ3/f3 is equal to or falls below the lower limit value in conditional expression (1), refractive power of the third lens group G3 decreases, then such a necessity increases as to augment refractive power of the first lens group G1 and the fourth lens group G4 for keeping the zoom ratio, and consequently curvature of field in the telephoto end state is hard to be corrected, which is also the undesirable aspect. Note that the lower limit value in conditional expression (1) is, it is preferable, set to 0.51 in order to secure the effect of the present embodiment, which enables refractive power of the third lens group G3 to be properly set and curvature of field to be further reduced especially when varying the magnification.

Moreover, it is desirable that the zoom optical system ZL according to the present embodiment satisfies, when f1 is defined as a focal length of the first lens group G1, and f2 is defined as a focal length of the second lens group G2, the following conditional expression (2).

$$4.50 < f1/(-f2) < 8.50 \quad (2)$$

Conditional expression (2) specifies refractive power of the first lens group G1 with respect to refractive power of the second lens group G2. The zoom optical system ZL in the present embodiment can realize the preferable optical performance and can secure the predetermined zoom ratio by satisfying conditional expression (2). When the value f1/(-f2) is equal to or exceeds the upper limit value of conditional expression (2), refractive power of the second lens group G2 increases, and curvature of field in a wide-angle end state and spherical aberration in the telephoto end state are hard to be corrected, which is also an undesirable aspect. It should be noted that the upper limit value in conditional expression (2) is, it is preferable, set to 7.0 in terms of securing the effect of the present embodiment, which enables refractive power of the second lens group G2 to be properly set and curvature of field in the wide-angle end state to be further reduced. When under the lower limit value in conditional expression (2), refractive power of the first lens group G1 decreases, and the it is difficult to correct curvature of field in the telephoto end state, which is also the undesirable aspect. Note that the lower limit value in conditional expression (2) is, it is preferable, set to 5.0 in order to secure the effect of the present embodiment, which enables refractive power of the first lens group G1 to be properly set and curvature of field in the telephoto end state to be more preferably reduced.

Further, it is desirable that the zoom optical system ZL according to the present embodiment satisfies, when Bfw is defined as a back focal length in the wide-angle end state, the following conditional expression (3):

$$0.50 < \phi3/Bfw < 0.85 \quad (3).$$

Conditional expression (3) specifies the back focal length in the wide-angle end state with respect to the light beam effective diameter of the third lens group G3. The zoom optical system ZL in the present embodiment can realize the preferable optical performance and can secure the predetermined zoom ratio by satisfying conditional expression (3). When the value φ3/Bfw is equal to or exceeds the upper limit value of conditional expression (3), as a result, refractive power of the second lens group G2 increases, and curvature of field and a distortion occur in the wide-angle end state, which is also the undesirable aspect. It should be noted that the upper limit value in conditional expression (3) is, it is preferable, set to 0.75 in terms of securing the effect of the present embodiment, which enables refractive power of each lens group to be properly set and curvature of field in the wide-angle end state to be further reduced. On the other hand, when the value φ3/Bfw is equal to or falls below the lower limit value in conditional expression (3), refractive power of the fourth lens group G4 resultantly decreases, and it is difficult to correct curvature of field in the telephoto end state, which is also the undesirable aspect. Note that the lower limit value in conditional expression (3) is, it is preferable, set to 0.55 in order to secure the effect of the present embodiment, which enables refractive power of each of the lens groups to be properly set and curvature of field in the telephoto end state to be further reduced.

It is to be noted that the zoom optical system ZL according to the present embodiment can acquire the excellent optical performance in the way of its being constructed to satisfy conditional expressions (3) and (2) in place of the expressions (1) and (2) described above.

Moreover, it is desirable that the zoom optical system ZL according to the present embodiment includes a cemented lens within the third lens group G3. This configuration enables chromatic aberration and coma in the telephoto end state to be corrected simultaneously.

Further, it is desirable that the zoom optical system ZL according to the present embodiment includes an aspherical lens within the second lens group G2. This configuration enables curvature of field and distortion in the wide-angle end state to be corrected simultaneously.

Furthermore, it is desirable that the zoom optical system ZL according to the present embodiment satisfies, when fvr is defined as a focal length of the movable lens group Gvr and ft is defined as a focal length of the zoom optical system in the telephoto end state, the following conditional expression (4).

$$0.20 < |fvr|/ft < 0.70 \quad (4)$$

Conditional expression (4) specifies refractive power of the movable lens group Gvr which shifts in a direction perpendicular to the optical axis with respect to refractive power of the whole system in the telephoto end state. The zoom optical system ZL in the present embodiment can realize the preferable optical performance and can secure the predetermined zoom ratio by satisfying conditional expression (4). When the value |fvr|/ft is equal to or exceeds the upper limit value of conditional expression (4), refractive power of the movable lens group Gvr decreases, refractive power of the fourth lens group G4 needs strengthening to shift an imaging position, and consequently it is difficult to correct curvature of field in the telephoto end state, which is also the undesirable aspect. It should be noted that the upper limit value in conditional expression (4) is, it is preferable, set to 0.60 in terms of securing the effect of the present embodiment, which enables refractive power of the movable lens group Gvr to be properly set and curvature of field in the telephoto end state to be corrected preferably. On the other hand, when the value |fvr|/ft is equal to or falls below the lower limit value in conditional expression (4), refractive power of the movable lens group Gvr increases, and it is difficult to correct spherical aberration in the telephoto end state, which is also the undesirable aspect. Note that the lower limit value in conditional expression (4) is, it is preferable, set to 0.25 in order to secure the effect of the present embodiment, which enables refractive power of the movable lens group Gvr to be properly set and spherical aberration in the telephoto end state to be corrected preferably.

Moreover, in the zoom optical system according to the present embodiment, it is desirable that the movable lens group Gvr includes the cemented lens. This configuration enables an eccentric coma and the chromatic aberration to be corrected simultaneously when moving in the direction perpendicular to the optical axis.

Further, in the zoom optical system ZL according to the present embodiment, it is desirable that the movable lens group Gvr is disposed closest to the image side of the third lens group G3. Furthermore, in this case, it is desirable that the third lens group G3 includes at least one lens on the image side of the movable lens group Gvr. It is also desirable that the movable lens group Gvr has negative refractive power. This configuration enables the zoom optical system ZL to be downsized and coma upon vibration reduction to be well corrected.

Furthermore, it is desirable that the zoom optical system ZL according to the present embodiment satisfies, when f3 is defined as the focal length of the third lens group G3 and f4 is defined as the focal length of the fourth lens group G4, the following conditional expression (5):

$$1.00 < f4/f3 < 4.00 \qquad (5).$$

Conditional expression (5) specifies refractive power of the fourth lens group G4 with respect to refractive power of the third lens group G3. The zoom optical system ZL in the present embodiment can realize the preferable optical performance and can secure the predetermined zoom ratio by satisfying conditional expression (5). When the value f4/f3 is equal to or exceeds the upper limit value of conditional expression (5), refractive power of the third lens group G3 increases, and it is difficult to correct coma in the telephoto end state, which is also the undesirable aspect. It should be noted that the upper limit value in conditional expression (5) is, it is preferable, set to 2.70 in terms of securing the effect of the present embodiment, which enables refractive power of the third lens group G3 to be properly set and coma in the telephoto end state to be well corrected. On the other hand, when the value f4/f3 is equal to or falls below the lower limit value in conditional expression (5), refractive power of the fourth lens group G4 increases, and it is difficult to correct curvature of field in the telephoto end state, which is also the undesirable aspect. Note that the lower limit value in conditional expression (5) is, it is preferable, set to 1.10 in order to secure the effect of the present embodiment, thereby enabling refractive power of the fourth lens group G4 to be properly set and curvature of field in the telephoto end state to be well corrected.

Further, it is desirable that the zoom optical system includes an aspherical lens within the fourth lens group. With this configuration, curvature of field can be well corrected.

Moreover, it is desirable that the zoom optical system includes a cemented lens constructed by, in order from the object side, a positive lens cemented with a negative lens within the fourth lens group G4. With this configuration, it is feasible to correct the chromatic aberration and spherical aberration in the telephoto end state and curvature of field in the wide-angle end state, simultaneously.

Figure 17:
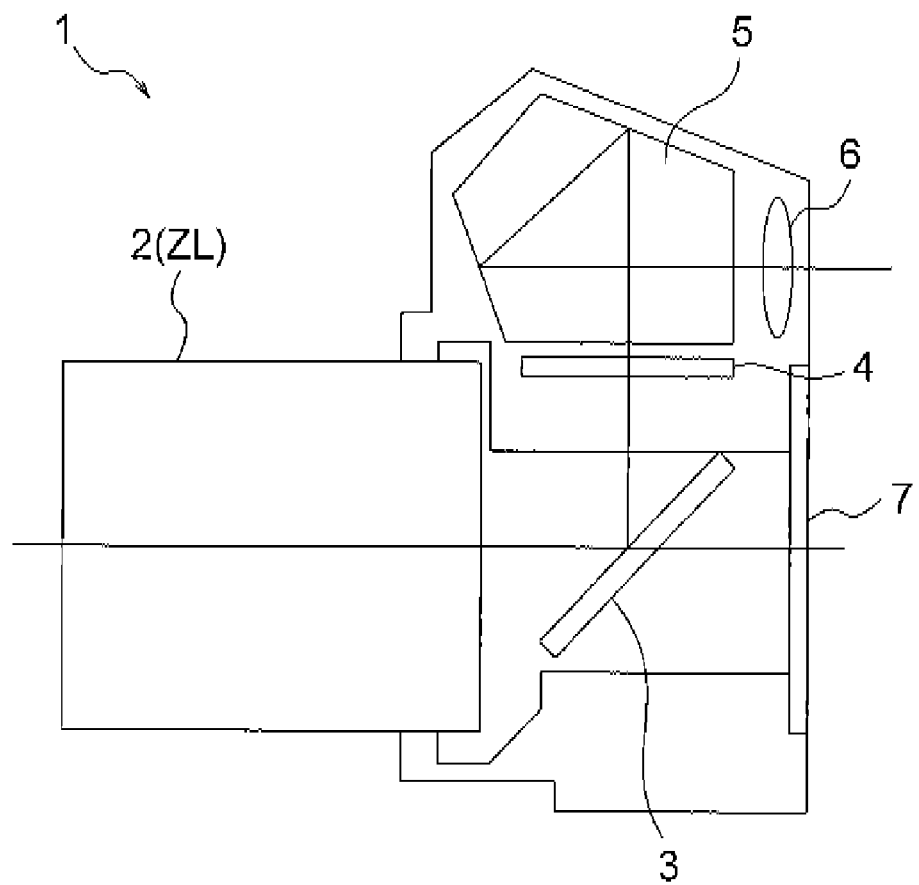
FIG. 17 is a sectional view showing a digital single lens reflex camera mounted with the zoom optical system according to the present embodiment.

FIG. 17 shows a schematic sectional view of a single-lens reflex digital camera 1 (which will hereinafter simply be termed a camera) by way of an optical apparatus including the zoom optical system described above. In the camera 1, light beams from an unillustrated object (an object to be imaged) are converged at a zoom optical system 2 (the zoom optical system ZL), and an image of the object is formed on a focusing screen 4 via a quick return mirror 3. Then, the light beams, of which the image is formed on the focusing screen 4, are reflected plural times within a pentagonal roof prism 5 and led to an eyepiece 6. A photographer is thereby capable of observing the object (the object to be imaged) as an erect image via the eyepiece 6.

Moreover, when the photographer presses an unillustrated release button, the quick return mirror 3 retreats outside of an optical path, and the light beams from the unillustrated object (the object to be imaged), which are converged by the zoom optical system 2, form an object image on an imaging device 7. Light beams from the object (the object to be imaged) are captured by the imaging device 7 and stored as the image of the object (the object to be imaged) in an unillustrated memory. Thus, the photographer can photograph the object (the object to be imaged) by use of the present camera 1. Note that the camera 1 illustrated in FIG. 17 may be constructed to retain the zoom optical system ZL in an attachable/detachable manner and may also be constructed integrally with the zoom optical system ZL. Moreover, the camera 1 may be constructed as a so-called the single lens reflex camera and may also be constructed as a compact camera including none of the quick return mirror.

It should be noted that the following contents can be properly adopted within a range which does not affect the optical performance.

To begin with, in Examples which will hereinafter be exemplified as well as in the discussion given above, though the 4-group configuration has been or will be shown, the constructive conditions described above can be also applied to other group configurations such as a 5-group configuration and a 6-group configuration. Further, other available configurations are a configuration of adding a lens or a lens group on the side closest to the object and a configuration of adding a lens or a lens group on the side closest to the image. Still further, a lens group represents a portion having at least one lens, which is separated by air distances that change upon zooming.

Moreover, such a focusing lens group may be taken that a single or a plurality of lens groups or a segmental lens group is moved along the optical axis to thereby perform focusing on a near-distance object point from an infinite-distance object point. In this case, the focusing lens group can be applied to an auto focus and is suited to driving a motor (such as an ultrasonic motor) for the auto focus. Especially, it is desirable that at least a part of the second lens group G2 serves as the focusing lens group.

A vibration reduction lens group which corrects an image blur caused by a hand vibration (camera shake) may also be constructed in a way that moves a lens group or a portion of lens group so as to include a component in the direction perpendicular to the optical axis or rotationally moves (sways) a lens group or a portion of lens group in an intra-plane direction containing the optical axis. In particular, as described above, it is preferable that at least a portion (the movable lens group Gvr) within the third lens group G3 is constructed as the vibration reduction lens group.

Moreover, any lens surface may be formed as a spherical surface, a plane surface or an aspherical surface. When a lens surface is a spherical surface or a plane surface, processing and assembly become easy, so that deterioration of optical performance caused by errors upon processing and assembling can be prevented. Even if the lens surface is shifted, deterioration in optical performance is small, so that it is desirable. When the lens surface is an aspherical surface, the aspherical surface may be fabricated by a fine grinding process, a glass molding process that a glass material is formed into an aspherical shape by a mold, or a compound type process that a resin material is formed into an aspherical shape on a glass surface. Any lens surface may be a diffractive optical surface. Any lens may be a graded index lens (GRIN lens), or a plastic lens.

An aperture stop S is, it is preferable, disposed in the vicinity or within the third lens group G3, however, an available configuration is that a lens frame substitutes for a role of the aperture stop without providing a member as the aperture stop.

Furthermore, each lens surface may be coated with an anti-reflection film having a high transmittance in a broad wave range in order to attain the high contrast and high optical performance by reducing a flare and ghost images.

The zoom optical system according to the present embodiment has a zoom ratio on the order of 3 to 10.

In the zoom optical system ZL according to the present embodiment, it is preferable that the first lens group G1 has two positive lens elements. Further, the first lens group G1 is composed of the lens elements which are disposed, in order from the object side, a positive/positive order with placing an air distance between the elements.

Moreover, in the zoom optical system ZL according to the present embodiment, it is preferable that the second lens group G2 includes one positive lens element and three negative lens elements. Further, it is preferable that the second lens group G2 is composed of, in order from the object side, a negative-negative-positive-negative order with placing an air distance between adjacent lens elements.

Furthermore, in the zoom optical system ZL according to the present embodiment, it is preferable that the third lens group G3 includes two positive lens elements and one negative lens element. Alternatively, it is preferable that the third lens group G3 is composed of three positive lens elements and two negative lens elements. Moreover, it is preferable that the third lens group G3 includes, in order from the object side, the lens elements which are disposed in a positive/positive/negative order or a positive/positive/positive/negative/negative order with placing each air distance between adjacent lens elements.

Further, in the zoom optical system ZL according to the present embodiment, it is preferable that the fourth lens group G4 includes one positive lens element and one negative lens element. Alternatively, it is preferable that the fourth lens group G4 includes two positive lens elements and one negative lens element. Moreover, it is preferable that the fourth lens group G4 includes, in order from the object side, the lens elements which are disposed in a positive/negative order or a positive/positive/negative order with placing each air distance between adjacent lens elements.

Note that the present embodiment has been discussed in a way that adds the constructive requirements for providing an easy-to-understand description of the present application, however, as a matter of course, the present application is not limited to this descriptive mode.

Figure 18:
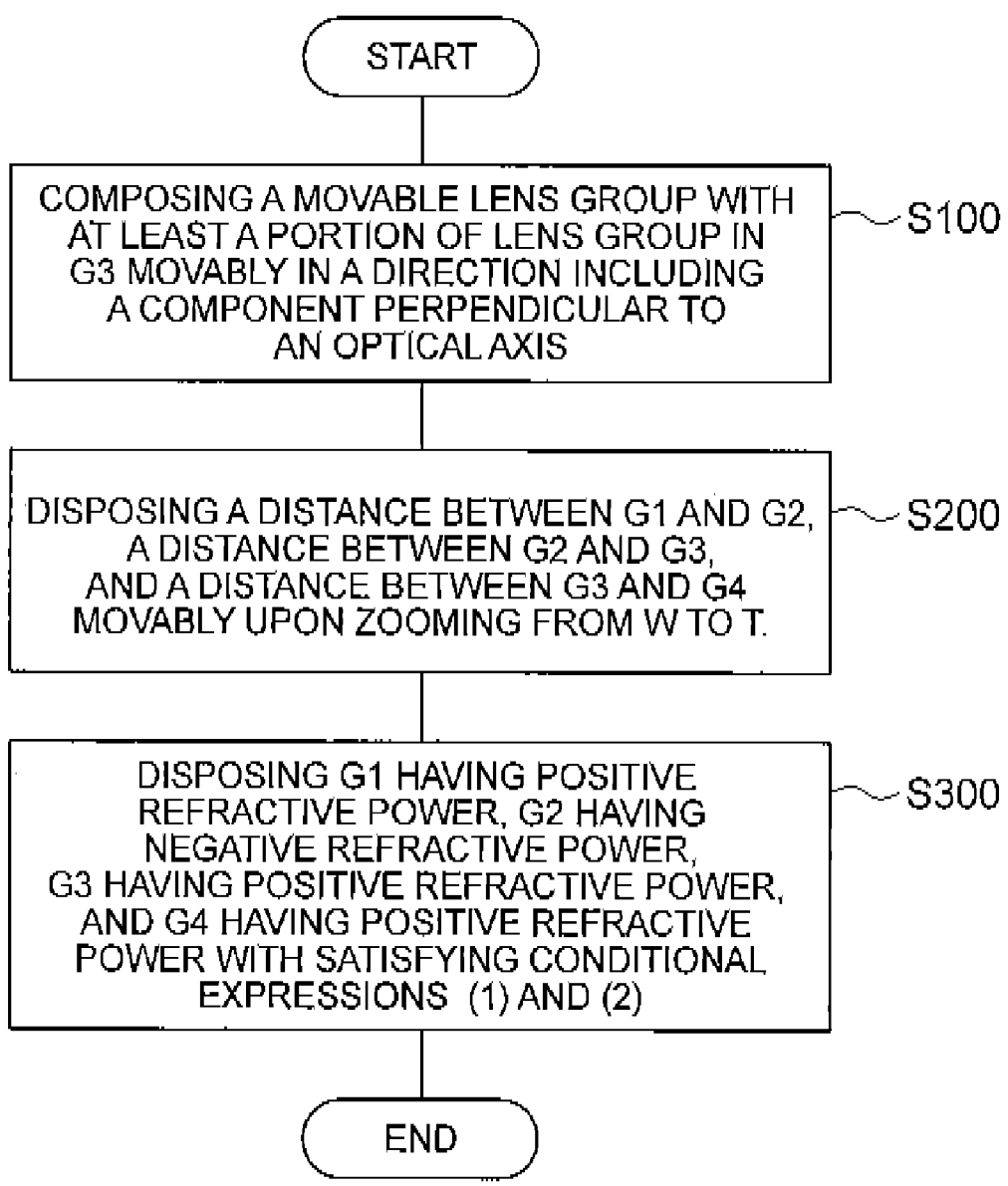
FIG. 18 is an explanatory flowchart of a method for manufacturing a zoom optical system according to the present embodiment.

An outline of a method for manufacturing the zoom optical system ZL including, in order from an object side, a first lens group, a second lens group, a third lens group and a fourth lens group according to the present embodiment will hereinafter be described with reference to FIG. 18.

A method for manufacturing a zoom optical system including, a first lens group, a second lens group, a third lens group and a fourth lens group in a lens barrel having a cylindrical shape includes the following steps of:

S100: composing a movable lens group with at least a portion of lens group Gvr in the third lens group G3 movably in a direction including a component perpendicular to an optical axis;

S200: disposing a distance between the first lens group G1 and the second lens group G2, a distance between the second lens group G2 and the third lens group G3, and a distance between the third lens group G3 and the fourth lens group G4 variably upon zooming from the wide-angle end state to the telephoto end state;

S300: disposing the first lens group G1 having positive refractive power, a second lens group G2 having negative refractive power, a third lens group G3 having positive refractive power, and a fourth lens group G4 having positive refractive power with satisfying the following conditional expressions (1) and (2):

$$0.47 < \phi 3/f3 < 1.00$$

$$4.50 < f1/(-f2) < 8.50$$

when $\phi 3$ denotes a light beam effective diameter of a lens surface positioned closest to the object side of said third lens group, f1 denotes a focal length of said first lens group, f2 denotes a focal length of said second lens group, and f3 denotes a focal length of said third lens group.

Each of Examples of the present application will hereinafter be described with reference to the accompanying drawings. FIGS. 1, 5, 9 and 13 illustrate how refractive power of zoom optical systems ZL1 through ZL4 are distributed and how the respective lens groups are moved in a change of the focal length state from the wide-angle end state (W) to the telephoto end state (T). Each of the zoom optical systems ZL1-ZL4 in the respective Examples is, as shown in FIGS. 1, 5, 9 and 13, composed of, in order from the object side, a first lens group G1 having positive refractive power, a second lens group G2 having negative refractive power, a third lens group G3 having positive refractive power and a fourth lens group G4 having positive refractive power. Then, upon zooming from a wide-angle end state to a telephoto end state, air distances between respective lens groups vary such that an air distance between the first lens group G1 and the second lens group G2 increases, an air distance between the second lens group G2 and the third lens group G3 decreases, and an air distance between the third lens group G3 and the fourth lens group G4 decreases.

An aperture stop S is positioned adjacent to the object side of the positive lens (L31) closest to the object side of the third lens group G3 in Examples 1, 2 and 3, or positioned adjacent to the image side of the positive lens (L31) closest to the object side of the third lens group G3 in Example 4, and moves together with the third lens group G3 upon zooming from the wide-angle end state to the telephoto end state. The focusing on a near-distance object point from an infinite-distance object point is carried out in a way that moves the second lens group G2 toward the object. The correction of the hand shake (vibration reduction) is performed by moving the cemented lens (the movable lens group Gvr) positioned closest to the image side (which is the second from the image side in Examples 3 and 4) within the third lens group G3 in a direction perpendicular to the optical axis.

In each of Examples, an aspherical surface is expressed by the following expression (a) when y is a height in the direction vertical to the optical axis, S(y) is a distance (sag quantity) along the optical axis from a tangent plane of a vertex of each aspherical surface at the height y up to each aspherical surface, r is a radius of curvature of the reference sphere (paraxial radius of curvature), k is a conical coefficient and An is an n-th order aspherical surface coefficient. Note that [E-n] represents [$\times 10^{-n}$] in the subsequent working examples.

$$S(y)=(y^2/r)/[1+[1-\kappa(y^2/r^2)]^{1/2}]+A4\times y^4+A6\times y^6+A8\times y^8+A10\times y^{10}+A12\times y^{12} \quad \text{(a)}$$

It should be noted that a second order aspherical surface coefficient A2 is "0" in each Examples. Further, the aspherical surface is attached with a mark "*" on the right side of a surface number in [Lens Data] of each Example.

Example 1

FIG. 1 is a view showing a configuration of a zoom optical system ZL1 according to Example 1. In the zoom optical system ZL1 in FIG. 1, the first lens group G1 is composed of, in order from an object side, a cemented lens constructed by a negative meniscus lens L11 with a convex surface directed to the object side cemented with a biconvex lens L12, and a positive meniscus lens L13 with the convex surface directed to the object side. The second lens group G2 is composed of, in order from the object side, a negative meniscus lens L21 with a convex surface directed to the object side, a biconcave lens L22, a biconvex lens L23 and a negative meniscus lens 124 with a concave surface directed to the object side, in which the negative meniscus lens L21 positioned closest to the object side of the second lens group G2 is an aspherical lens of which an object-sided glass lens surface is formed with an aspherical surface, and the negative meniscus lens L24 positioned closest to the image side is an aspherical lens of which an image-sided glass lens surface is formed with an aspherical surface. The third lens group G3 is composed of, in order from the object side, a biconvex lens L31, a cemented lens constructed by a biconvex lens L32 cemented with a negative meniscus lens L33 with a concave surface directed to the object side, and a cemented lens constructed by a positive meniscus lens L34 with a convex surface directed to the image side cemented with a biconcave lens L35 (a movable lens group Gvr), in which the positive meniscus lens L34 positioned second from the image side of the third lens group G3 is an aspherical lens of which the object-sided glass lens surface is formed with an aspherical surface. The fourth lens group G4 is composed of, in order from the object side, a cemented lens constructed by a negative meniscus lens L41 with a convex surface directed to the object side cemented with a biconvex lens L42, and a cemented lens constructed by a biconvex lens L43 cemented with a negative meniscus lens L44 with a convex surface directed to the image side, in which the negative meniscus lens L44 positioned closest to the image side of the fourth lens group G4 is an aspherical lens of which an image-sided glass lens surface is formed with an aspherical surface.

Note that a rotational vibration through an angle θ is corrected by a lens of which a focal length of the whole system is f and a vibration reduction coefficient (a ratio of an image shift quantity on the image plane with respect to a shift quantity of the movable lens group Gvr for correcting the vibration) is K, and for attaining this correction the movable lens group Gvr for correcting the vibration may be moved by (f·tan θ)/K in the direction perpendicular to the optical axis (the description is the same in the subsequent Examples). In the wide-angle end state according to Example 1, the vibration reduction coefficient is 0.74, and the focal length is 24.7 (mm), so that a shift quantity of the movable lens group Gvr for correcting the rotational vibration through 0.52° is 0.30 (mm). In the telephoto end state according to Example 1, the vibration reduction coefficient is 1.34, and the focal length is 116.7 (mm), so that the shift quantity of the movable lens group Gvr for correcting the rotational vibration through 0.20° is 0.30 (mm).

The following table 1 shows various items of data according to Example 1. In [Specifications], W denotes a wide-angle end state, M denotes an intermediate focal length state, T denotes a telephoto end state, f denotes a focal length of the zoom optical system, FNO denotes an f-number, 2ω denotes an angle of view (unit: degree), TL denotes a total lens length, and Bf denotes a back focallength. In [Lens Data], the left most column "i" shows the lens surface number counted in order from the object side along light propagation direction, the second column "r" shows a radius of curvature of the lens surface, the third column "d" shows a distance to the next optical surface, the fourth column "vd" shows an Abbe number at d-line (wavelength λ=587.6 nm), and the fifth column "nd" shows a refractive index at d-line (wavelength λ=587.6 nm). In the fifth column "nd" refractive index of the air nd=1.000000 is omitted. In the second column "r", r=0.0000 indicates a plane surface. In third column "d", Bf denotes a back focal length. In [Lens Group Data], a focal length of each lens group is shown. In [Variable Distances], variable distances and a total lens length TL with respect to each focal length state are shown. In [Values for Conditional Expressions], values for conditional expressions are shown. In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples.

TABLE 1

[Specifications]

| | W | M | T |
|---|---|---|---|
| f = | 24.7 | 49.8 | 116.7 |
| FNO = | 4.1 | 4.1 | 4.1 |
| 2ω = | 85.5 | 45.8 | 20.4 |
| TL = | 138.9 | 158.5 | 195.2 |
| Bf = | 34.3 | 53.3 | 78.4 |

[Lens Data]

| i | r | d | vd | nd |
|---|---|---|---|---|
| 1 | 433.3380 | 1.5 | 23.78 | 1.84666 |
| 2 | 106.2717 | 7.5 | 65.47 | 1.60300 |
| 3 | −488.5544 | 0.2 | | |
| 4 | 61.7947 | 6.1 | 46.63 | 1.81600 |
| 5 | 157.8314 | (d5) | | |
| *6 | 172.2219 | 0.2 | 38.09 | 1.55389 |
| 7 | 108.7589 | 1.5 | 42.72 | 1.83481 |
| 8 | 16.8280 | 7.0 | | |
| 9 | −32.9635 | 1.1 | 42.72 | 1.83481 |
| 10 | 90.3900 | 0.1 | | |
| 11 | 49.7564 | 5.0 | 23.78 | 1.84666 |
| 12 | −28.7288 | 1.0 | | |
| 13 | −21.6635 | 1.1 | 42.72 | 1.83481 |
| 14* | −59.2704 | (d14) | | |
| 15 | 0.0000 | 0.2 | Aperture Stop S | |
| 16 | 83.5572 | 3.5 | 52.29 | 1.75500 |
| 17 | −63.1465 | 0.2 | | |
| 18 | 37.9829 | 6.5 | 65.47 | 1.60300 |
| 19 | −29.1740 | 1.5 | 23.78 | 1.84666 |
| 20 | −154.4508 | 2.4 | | |
| 21* | −50.0000 | 0.1 | 38.09 | 1.55389 |
| 22 | −50.0000 | 2.9 | 23.78 | 1.84666 |
| 23 | −24.2674 | 1.5 | 45.30 | 1.79500 |
| 24 | 1552.3648 | (d24) | | |
| 25 | 37.1161 | 1.5 | 32.35 | 1.85026 |
| 26 | 23.1455 | 6.0 | 67.87 | 1.59319 |
| 27 | −70.7250 | 6.3 | | |
| 28 | 293.8058 | 5.0 | 82.56 | 1.49782 |
| 29 | −29.7266 | 2.0 | 46.73 | 1.76546 |
| 30* | −147.4982 | (Bf) | | |

TABLE 1-continued

[Aspherical Data]

Surface Number: 6

κ = 99.0000
A4 = 7.24080E−06
A6 = −1.89560E−08
A8 = 5.61340E−11
A10 = −1.00700E−13
A12 = 0.00000E+00

Surface Number: 14

κ = 1.0000
A4 = −8.90470E−07
A6 = −8.45490E−09
A8 = 2.43120E−11
A10 = 0.00000E+00
A12 = 0.00000E+00

Surface Number: 21

κ = 1.0000
A4 = 5.76870E−06
A6 = 4.96800E−09
A8 = 0.00000E+00
A10 = 0.00000E+00
A12 = 0.00000E+00

Surface Number: 30

κ = 1.0000
A4 = 1.28760E−05
A6 = 1.57610E−08
A8 = −2.42460E−11
A10 = 1.25150E−13
A12 = 0.00000E+00

[Variable Distances upon Zooming]

|      | W     | M     | T     |
|------|-------|-------|-------|
| f =  | 24.7  | 49.8  | 116.7 |
| d5 = | 2.2   | 20.1  | 42.7  |
| d14 =| 20.6  | 9.1   | 1.0   |
| d24 =| 9.7   | 3.8   | 1.0   |
| Bf = | 34.3  | 53.3  | 78.4  |
| TL = | 138.9 | 158.5 | 195.2 |

[Lens Group Data]

| Group | I  | Focal Length |
|-------|----|--------------|
| 1     | 1  | 108.9        |
| 2     | 6  | −17.2        |
| 3     | 16 | 44.1         |
| 4     | 25 | 54.6         |

[Values for Conditional Expressions]

fvr = −65.4
φ3 = 23.9
(1) φ3/f3 = 0.54
(2) f1/(−f2) = 6.32
(3) φ3/Bfw = 0.70
(4) |fvr|/ft = 0.56
(5) f4/f3 = 1.24

Figure 2B:
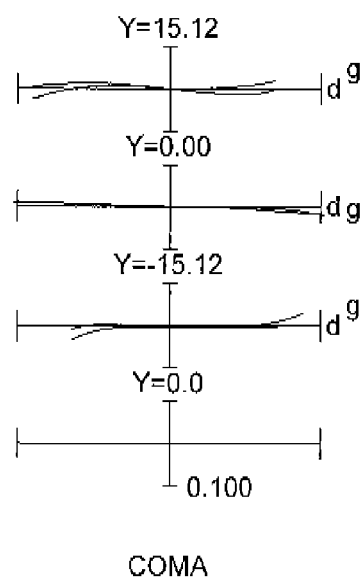
Figure 3:
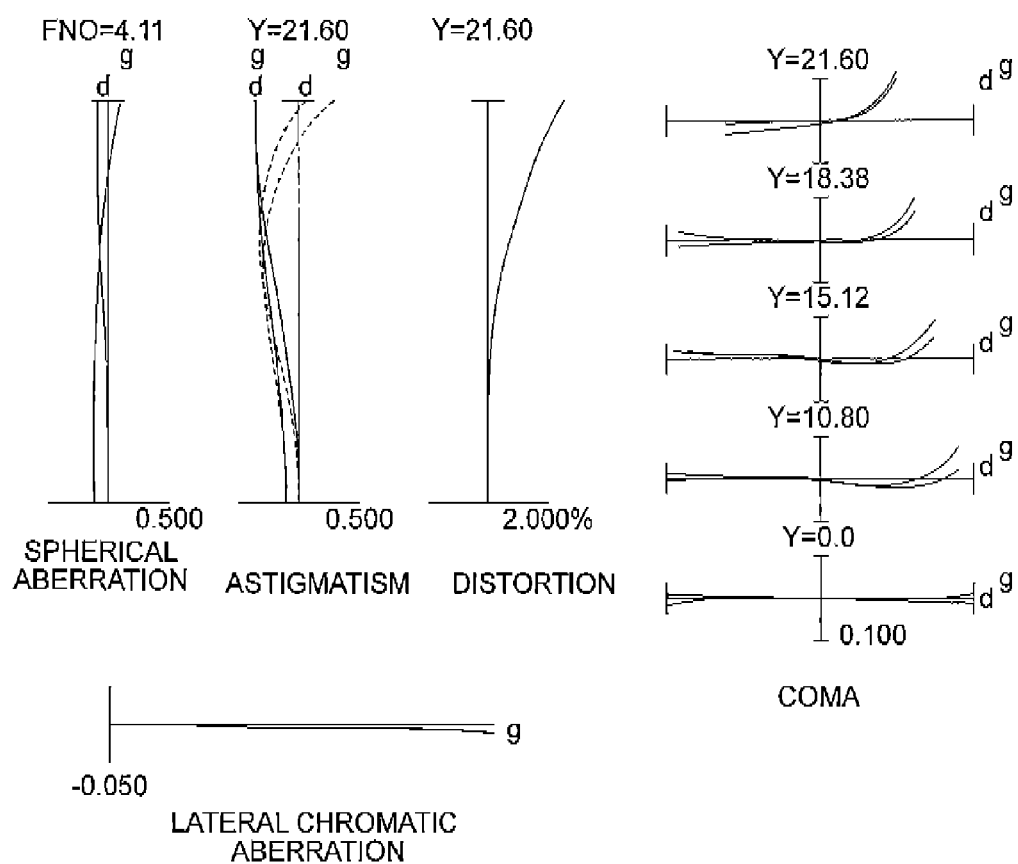
FIG. 3 is a diagram of the aberration in the infinite-distance focusing state in an intermediate focal length state according to Example 1.
Figure 4A:
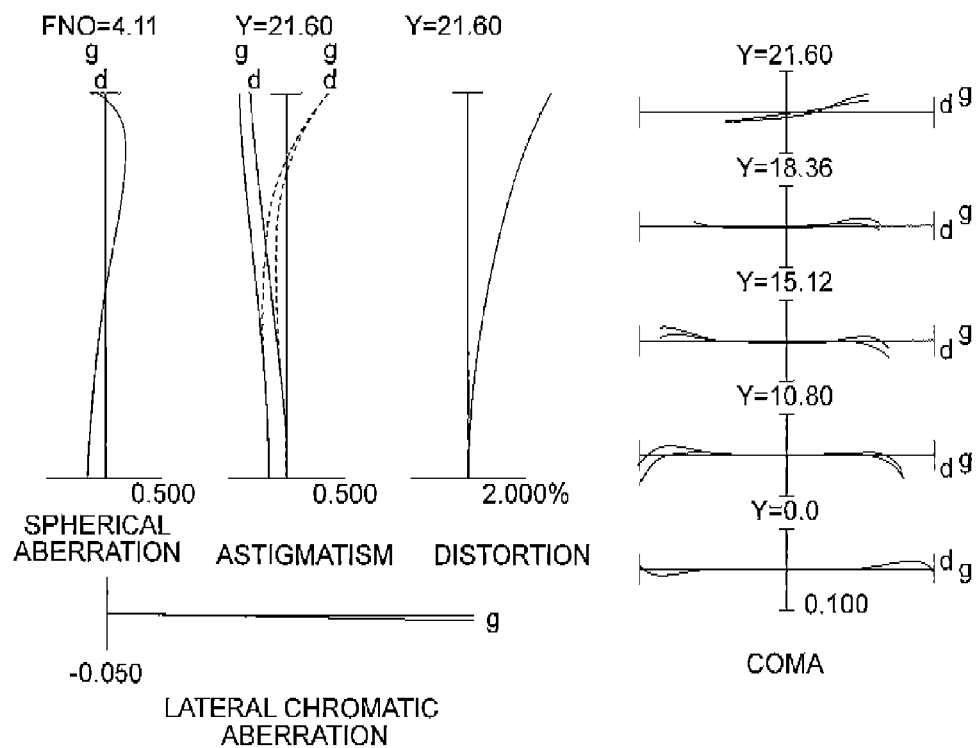
FIGS. 4A and 4B are diagrams of the various aberrations in the infinite-distance focusing state according to Example 1.
Figure 4B:
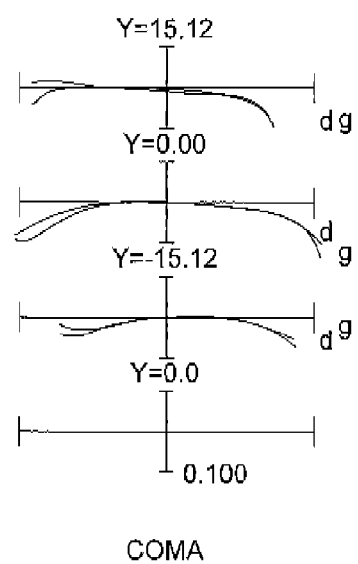

FIGS. 2A and 2B are diagrams of various aberrations in an infinite-distance focusing state in Example 1; FIG. 2A is a diagram of the various aberrations in a wide-angle end state; and FIG. 2B is a diagram of a coma when correcting a rotational vibration through 0.52° in an infinite-distance photographing state in the wide-angle end state. FIG. 3 is a diagram of the aberration in the infinite-distance focusing state in an intermediate focal length state according to Example 1. FIGS. 4A and 4B are diagrams of the various aberrations in the infinite-distance focusing state according to Example 1; FIG. 4A is the diagram of the various aberrations in the telephoto end state; FIG. 4B is a diagram of coma when correcting a rotational vibration through 0.20° in the infinite-distance photographing state in the telephoto end state.

In graphs showing astigmatism, a solid line indicates a sagittal image plane, and a broken line indicates a meridional image plane. In respective graphs, FNO denotes an f-number, Y denotes an image height, d denotes d-line (wavelength λ=587.6 nm), and g denotes g-line (wavelength λ=435.6 nm). The above-described explanation regarding various aberration graphs is the same as the other Examples.

As is apparent from the respective graphs, the zoom optical system according to Example 1 shows superb optical performance as a result of good corrections to various aberrations in each focal length state from the wide-angle end state through the telephoto end state.

Example 2

Figure 5:
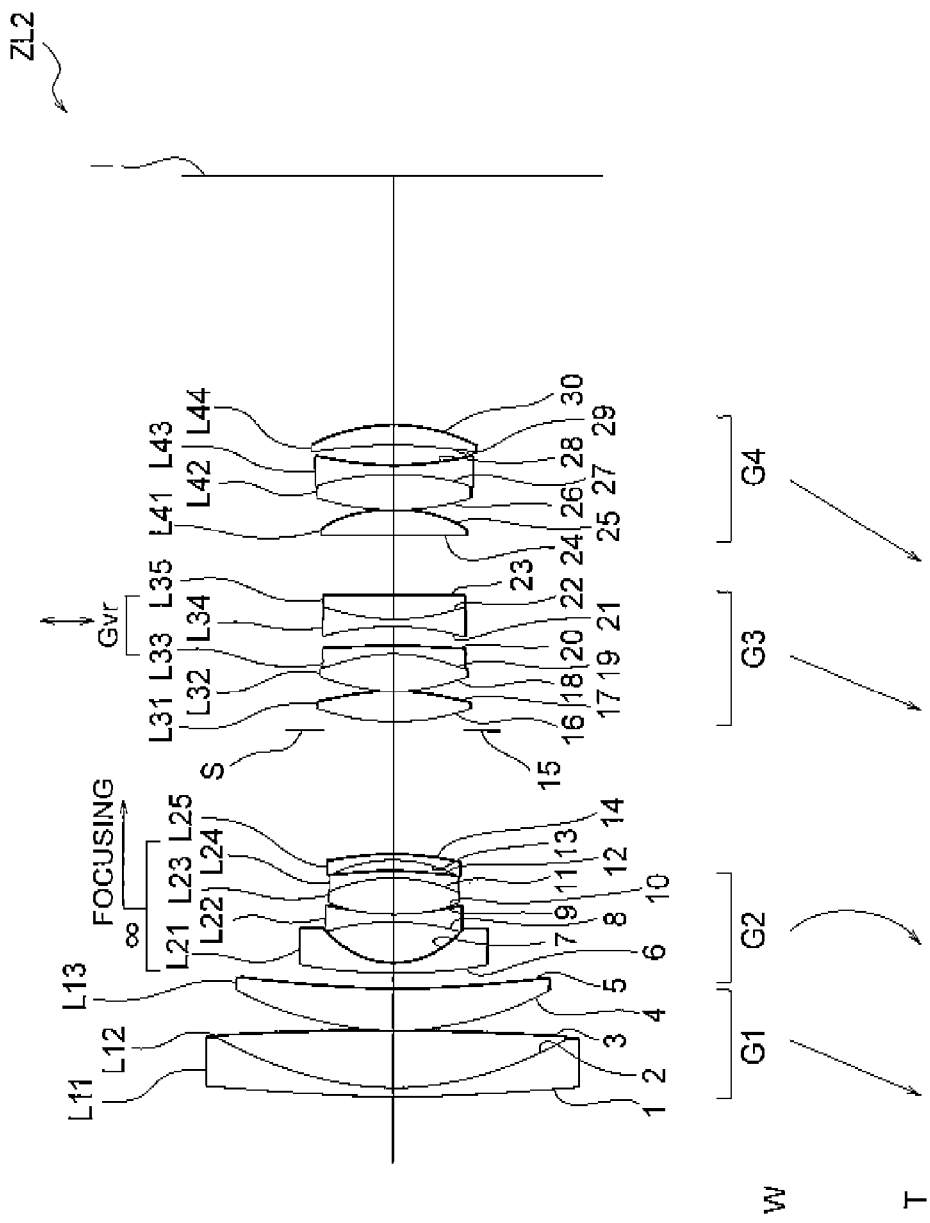
FIG. 5 is a sectional view showing a configuration of the zoom optical system according to Example 2.

FIG. 5 is a view showing a configuration of the zoom optical system ZL2 according to Example 2. In the zoom optical system ZL2 in FIG. 5, the first lens group G1 is composed of, in order from an object side, a cemented lens constructed by the negative meniscus lens L11 with a convex surface directed to the object side cemented with a biconvex lens L12, and a positive meniscus lens L13 with a convex surface directed to the object side. The second lens group G2 is composed of, in order from the object side, a negative meniscus lens L21 with a convex surface directed to the object side, a biconcave lens L22, a cemented lens constructed by a biconvex lens L23 cemented with a negative meniscus lens L24 with a concave surface directed to the object side, and a negative meniscus lens L25 with a concave surface directed to the object side, in which the negative meniscus lens L21 positioned closest to the object side of the second lens group G2 is an aspherical lens of which the object-sided glass lens surface is formed with an aspherical surface. The third lens group G3 is composed of, in order from the object side, a biconvex lens L31, a cemented lens constructed by a biconvex lens L32 cemented with a negative meniscus lens L33 with a concave surface directed to the object side, and a cemented lens (the movable lens group Gvr) constructed by a biconcave lens L34 cemented with a positive meniscus lens L35 with a convex surface directed to the object side, in which the biconcave lens L34 positioned second from the image side of the third lens group G3 is an aspherical lens of which the object-sided glass lens surface is formed with an aspherical surface. The fourth lens group G4 is composed of, in order from the object side, a biconvex lens L41, a cemented lens constructed by the biconvex lens L42 cemented with a biconcave lens L43, and a positive meniscus lens L44 with a convex surface directed to the image side, in which the biconvex lens L41 positioned closest to the object side of the fourth lens group G4 is an aspherical lens of which the object-sided glass lens surface is formed with an aspherical surface.

In the wide-angle end state according to Example 2, the vibration reduction coefficient is 1.00, and the focal length is 24.6 (mm), so that the shift quantity of the movable lens group Gvr for correcting the rotational vibration through 0.64° is 0.27 (mm). In the telephoto end state according to Example 2, the vibration reduction coefficient is 1.72, and the focal length is 102.0 (mm), so that the shift quantity of the movable lens group Gvr for correcting the rotational vibration through 0.34° is 0.34 (mm).

The following table 2 shows the various items of data according to Example 2.

TABLE 2

[Specifications]

| | W | M | T |
|---|---|---|---|
| f = | 24.6 | 50.0 | 102.0 |
| FNO = | 4.1 | 4.1 | 4.1 |
| 2ω = | 85.5 | 46.1 | 23.3 |
| TL = | 146.6 | 167.1 | 199.6 |
| Bf = | 39.9 | 64.5 | 84.0 |

[Lens Data]

| i | r | d | νd | nd |
|---|---|---|---|---|
| 1 | 338.9020 | 1.5 | 32.35 | 1.85026 |
| 2 | 60.6265 | 8.7 | 65.47 | 1.60300 |
| 3 | −725.5504 | 0.2 | | |
| 4 | 54.1848 | 7.0 | 52.29 | 1.75500 |
| 5 | 220.8993 | (d5) | | |
| 6* | 169.7193 | 1.5 | 42.72 | 1.83480 |
| 7 | 16.3161 | 6.3 | | |
| 8 | −44.8119 | 1.0 | 52.31 | 1.75499 |
| 9 | 41.2641 | 0.2 | | |
| 10 | 33.8490 | 5.4 | 23.77 | 1.84666 |
| 11 | −34.9782 | 1.1 | 42.72 | 1.83481 |
| 12 | −62.4140 | 1.8 | | |
| 13 | −24.8014 | 1.0 | 40.94 | 1.80610 |
| 14 | −49.2693 | (d14) | | |
| 15 | 0.0000 | 1.5 | Aperture Stop S | |
| 16 | 45.3309 | 4.5 | 52.29 | 1.75500 |
| 17 | −49.3832 | 0.2 | | |
| 18 | 37.6971 | 5.9 | 82.56 | 1.49782 |
| 19 | −29.6774 | 1.0 | 23.77 | 1.84666 |
| 20 | −400.6411 | 3.3 | | |
| 21 | −38.0412 | 1.0 | 42.72 | 1.83481 |
| 22 | 38.4634 | 3.7 | 23.78 | 1.84666 |
| 23 | −664.9509 | (d23) | | |
| 24* | 189.6816 | 4.0 | 70.45 | 1.48749 |
| 25 | −27.6473 | 0.2 | | |
| 26 | 48.2882 | 5.6 | 82.56 | 1.49782 |
| 27 | −44.5374 | 1.2 | 42.72 | 1.83481 |
| 28 | 53.3483 | 3.3 | | |
| 29 | −84.9425 | 3.1 | 65.47 | 1.60300 |
| 30 | −31.3071 | (Bf) | | |

[Aspherical Data]

Surface Number: 6

κ = 20.2901
A4 = 7.21010E−06
A6 = −1.68940E−08
A8 = 7.36240E−11
A10 = −3.11700E−13
A12 = 0.61143E−15

Surface Number: 21

κ = 2.4406
A4 = 8.56080E−06
A6 = 8.41180E−09
A8 = 0.00000E+00
A10 = 0.00000E+00
A12 = 0.00000E+00

Surface Number: 24

κ = 1.0000
A4 = −2.36790E−05
A6 = 1.97200E−08
A8 = 1.54680E−10
A10 = 4.10050E−13
A12 = 0.00000E+00

[Variable Distances upon Zooming]

| | W | M | T |
|---|---|---|---|
| f = | 24.6 | 50.0 | 102.0 |
| d5 = | 2.5 | 15.9 | 36.8 |
| d14 = | 19.8 | 7.6 | 1.5 |
| d23 = | 9.4 | 4.0 | 2.2 |
| Bf = | 39.9 | 64.5 | 84.0 |
| TL = | 146.6 | 167.1 | 199.6 |

[Lens Group Data]

| Group | I | Focal Length |
|---|---|---|
| 1 | 1 | 99.6 |
| 2 | 6 | −16.0 |
| 3 | 16 | 42.8 |
| 4 | 24 | 49.8 |

[Values for Conditional Expressions]

fvr = −49.3
φ3 = 24.3
(1) φ3/f3 = 0.57
(2) f1/(−f2) = 6.21
(3) φ3/Bfw = 0.61
(4) |fvr|/ft = 0.48
(5) f4/f3 = 1.16

Figure 6A:
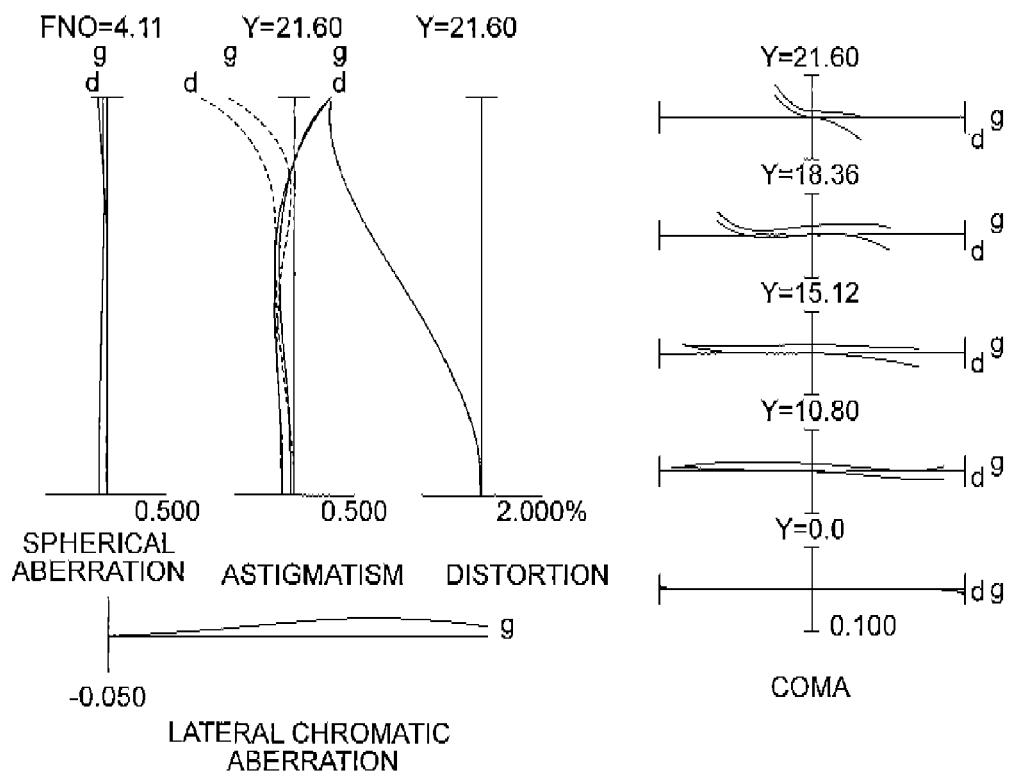
FIGS. 6A and 6B are diagrams of the various aberrations in the infinite-distance focusing state according to Example 2.
Figure 6B:
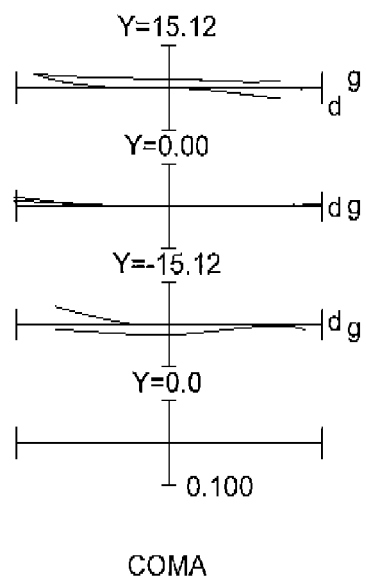
Figure 7:
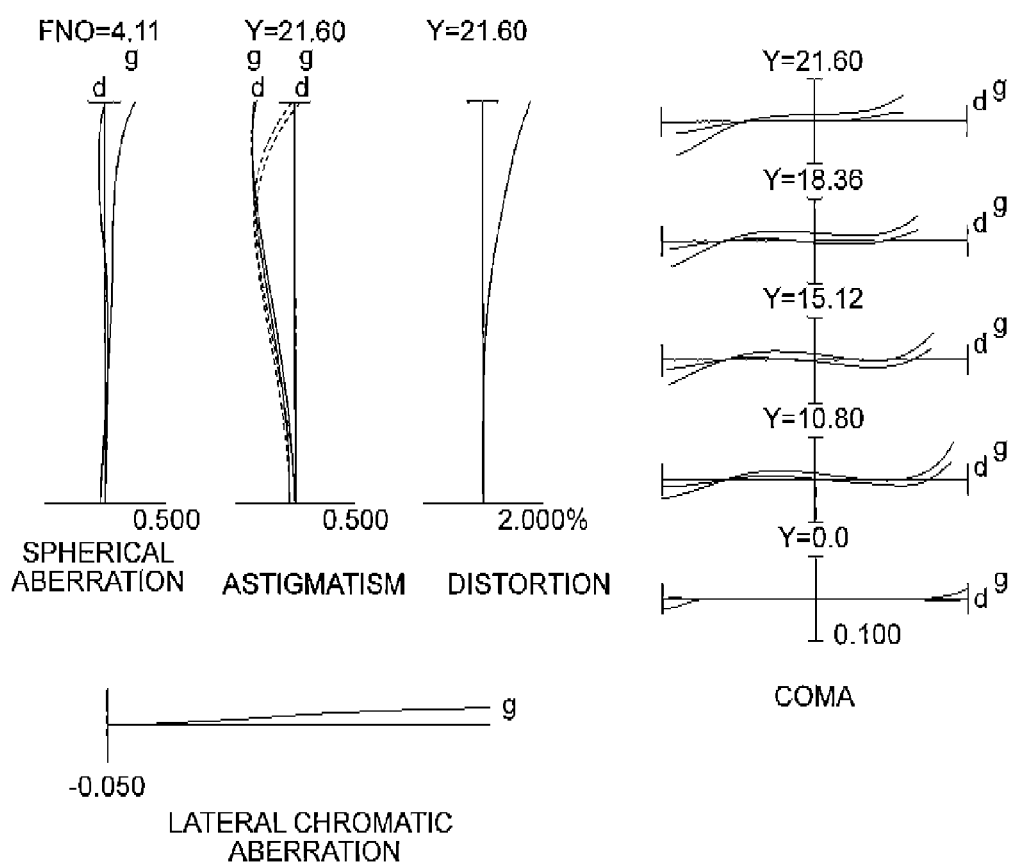
FIG. 7 is a diagram of the aberration in the infinite-distance focusing state in an intermediate focal length state according to Example 2.

FIGS. 6A and 68 are diagrams of the various aberrations in the infinite-distance focusing state according to Example 2; FIG. 6A is the diagram of the various aberrations in the wide-angle end state; FIG. 68 is a diagram of coma when correcting the rotational vibration through 0.64° in the infinite-distance photographing state in the wide-angle end state. FIG. 7 is a diagram of the aberration in the infinite-distance focusing state in an intermediate focal length state according to Example 2. FIGS. 8A and 8B are diagrams of the various aberrations in the infinite-distance focusing state according to Example 2; FIG. 8A is the diagram of the various aberrations in the telephoto end state; FIG. 8B is a diagram of coma when correcting the rotational vibration through 0.34° in the infinite-distance photographing state in the telephoto end state.

As is apparent from the respective graphs, the zoom optical system according to Example 2 shows superb optical performance as a result of good corrections to various aberrations in each focal length state from the wide-angle end state through the telephoto end state.

Example 3

FIG. 9 is a sectional view showing a configuration of the zoom optical system ZL3 according to Example 3. In the zoom optical system ZL3 in FIG. 9, the first lens group G1 is composed of, in order from the object side, a cemented lens constructed by a negative meniscus lens L11 with a convex surface directed to the object side cemented with a biconvex lens L12 and a positive meniscus lens L13 with a convex surface directed to the object side. The second lens group G2 is composed of, in order from the object side, a negative meniscus lens L21 with a convex surface directed to the object side, negative meniscus lens L22 with a concave surface directed to the object side, a biconvex lens L23 and a biconcave lens L24, in which the negative meniscus lens L21 positioned closest to the object side of the second lens group G2 is an aspherical lens of which the object-sided glass lens surface is formed with an aspherical surface, and the negative meniscus lens L24 positioned closest to the image side is an aspherical lens of which the image-sided glass lens surface is formed with an aspherical surface. The third lens group G3 is composed of, in order from the object side, a biconvex lens L31, a cemented lens constructed by a negative meniscus lens L32 with a concave surface directed to the image side cemented with a biconvex lens L33, a biconcave lens L34, a cemented lens (the movable lens group Gvr) constructed by a positive meniscus lens L35 with a convex surface directed to the image side cemented with a biconcave lens L36, and a negative meniscus lens L37 with a concave surface directed to the object side. The fourth lens group G4 is composed of, in order from the object side, a positive meniscus lens L41 with a convex surface directed to the image side, and a cemented lens constructed by a positive meniscus lens L42 with a convex surface directed to the image side cemented with a negative meniscus lens L43 with a convex surface directed to the image side, in which the positive meniscus lens L41 positioned closest to the object side of the fourth lens group G4 is an aspherical lens of which the object-sided glass lens surface is formed with an aspherical surface.

In the wide-angle end state according to Example 3, the vibration reduction coefficient is 1.06, and the focal length is 27.2 (mm), so that the shift quantity of the movable lens group Gvr for correcting the rotational vibration through 0.66° is 0.3 (mm). In the telephoto end state according to Example 3, the vibration reduction coefficient is 1.58, and the focal length is 143.0 (mm), so that the shift quantity of the movable lens group Gvr for correcting the rotational vibration through 0.19° is 0.3 (mm).

The following table 3 shows the various items of data according to Example 3.

TABLE 2

[Specifications]

|  | W | M | T |
|---|---|---|---|
| f = | 27.2 | 48.1 | 143.0 |
| FNO = | 4.5 | 4.3 | 4.2 |
| 2ω = | 79.7 | 47.6 | 16.6 |
| TL = | 144.9 | 158.0 | 188.8 |
| Bf = | 38.5 | 55.5 | 70.7 |

[Lens Data]

| i | r | d | νd | nd |
|---|---|---|---|---|
| 1 | 157.2675 | 2.0 | 23.77 | 1.84666 |
| 2 | 74.2018 | 7.5 | 67.87 | 1.59318 |
| 3 | −7189.0015 | 0.1 | | |
| 4 | 53.7391 | 5.6 | 52.29 | 1.75500 |
| 5 | 142.1986 | (d5) | | |
| 6* | 153.0455 | 1.2 | 46.63 | 1.81600 |
| 7 | 14.4795 | 8.0 | | |
| 8 | −25.2816 | 1.0 | 45.30 | 1.79500 |
| 9 | −53.6682 | 0.1 | | |
| 10 | 52.4423 | 4.2 | 23.77 | 1.84666 |
| 11 | −32.7813 | 0.5 | | |
| 12 | −26.1324 | 1.0 | 40.94 | 1.80610 |
| 13* | 1638.3373 | (d13) | | |
| 14 | 61.1384 | 2.6 | 52.29 | 1.75500 |
| 15 | −388.3196 | 1.4 | | |
| 16 | 0.0000 | 0.5 | Aperture Stop S | |
| 17 | 27.8231 | 3.0 | 23.77 | 1.84666 |
| 18 | 16.9699 | 6.6 | 70.45 | 1.48749 |
| 19 | −58.9172 | 0.1 | | |
| 20 | 47.2598 | 3.4 | 67.87 | 1.59318 |
| 21 | −433.2258 | 1.8 | | |
| 22 | −58.5928 | 3.5 | 32.35 | 1.85026 |
| 23 | −29.8351 | 1.0 | 52.29 | 1.75500 |
| 24 | 80.4710 | 3.0 | | |
| 25 | −131.0107 | 1.0 | 53.89 | 1.71300 |
| 26 | −943.5177 | (d26) | | |
| 27 | −1253.2789 | 5.7 | 61.18 | 1.58913 |
| 28 | −21.8392 | 0.1 | | |
| 29 | −40.9854 | 4.0 | 70.45 | 1.48749 |
| 30 | −28.2678 | 2.0 | 32.35 | 1.85026 |
| 31 | −73.8800 | (Bf) | | |

TABLE 2-continued

[Aspherical Data]

Surface Number: 6

κ = 1.0000
A4 = 9.10590E−06
A6 = −2.46720E−08
A8 = 4.74440E−11
A10 = −3.43860E−14
A12 = 0.00000E+00

Surface Number: 13

κ = 1.0000
A4 = −4.34150E−06
A6 = −1.54250E−08
A8 = 8.52640E−12
A10 = −8.74630E−14
A12 = 0.00000E+00

Surface Number: 27

κ = −30.0000
A4 = −2.01880E−05
A6 = −1.57780E−08
A8 = 4.19740E−11
A10 = −1.12730E−13
A12 = 0.00000E+00

[Variable Distances upon Zooming]

|  | W | M | T |
|---|---|---|---|
| f = | 27.2 | 48.1 | 143.0 |
| d5 = | 2.9 | 16.0 | 44.5 |
| d13 = | 24.0 | 13.4 | 1.2 |
| d26 = | 8.3 | 2.0 | 1.3 |
| Bf = | 38.5 | 55.5 | 70.7 |
| TL = | 144.9 | 158.0 | 188.8 |

[Lens Group Data]

| Group | I | Focal Length |
|---|---|---|
| 1 | 1 | 91.4 |
| 2 | 6 | −17.1 |
| 3 | 14 | 36.4 |
| 4 | 27 | 74.8 |

[Values for Conditional Expressions]

fvr = −47.8
φ3 = 23.1
(1) φ3/f3 = 0.63
(2) f1/(−f2) = 5.36
(3) φ3/Bfw = 0.60
(4) |fvr|/ft = 0.33
(5) f4/f3 = 2.06

Figure 10A:
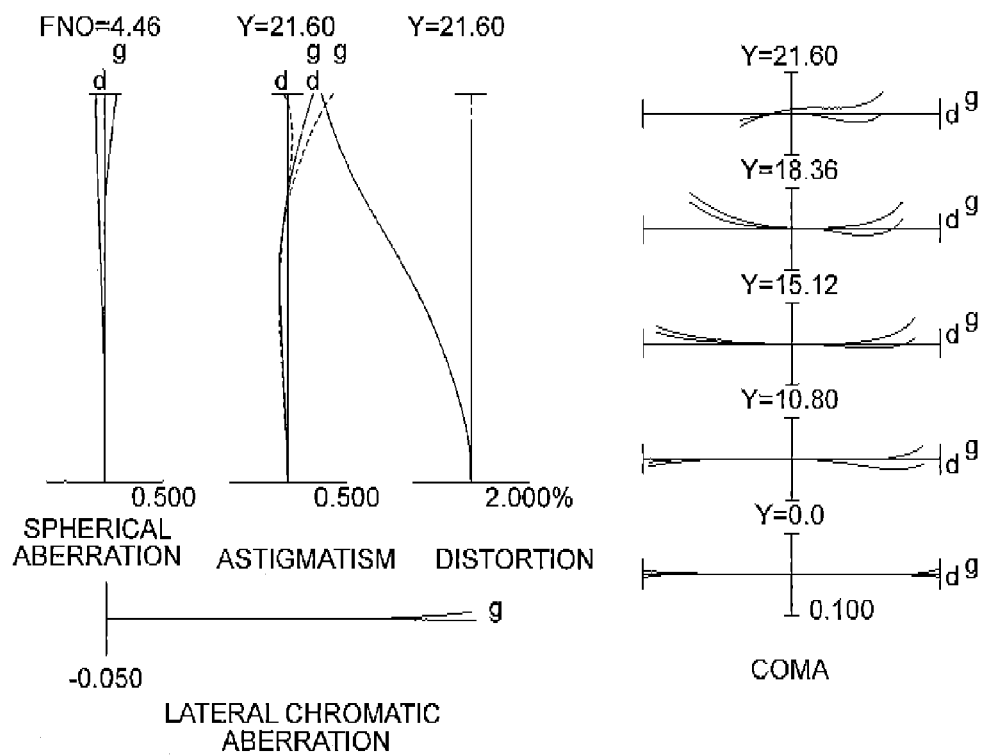
FIGS. 10A and 10B are diagrams of the various aberrations in the infinite-distance focusing state according to Example 3.
Figure 10B:
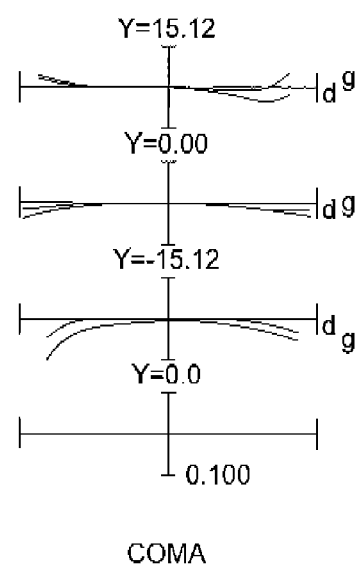
Figure 11:
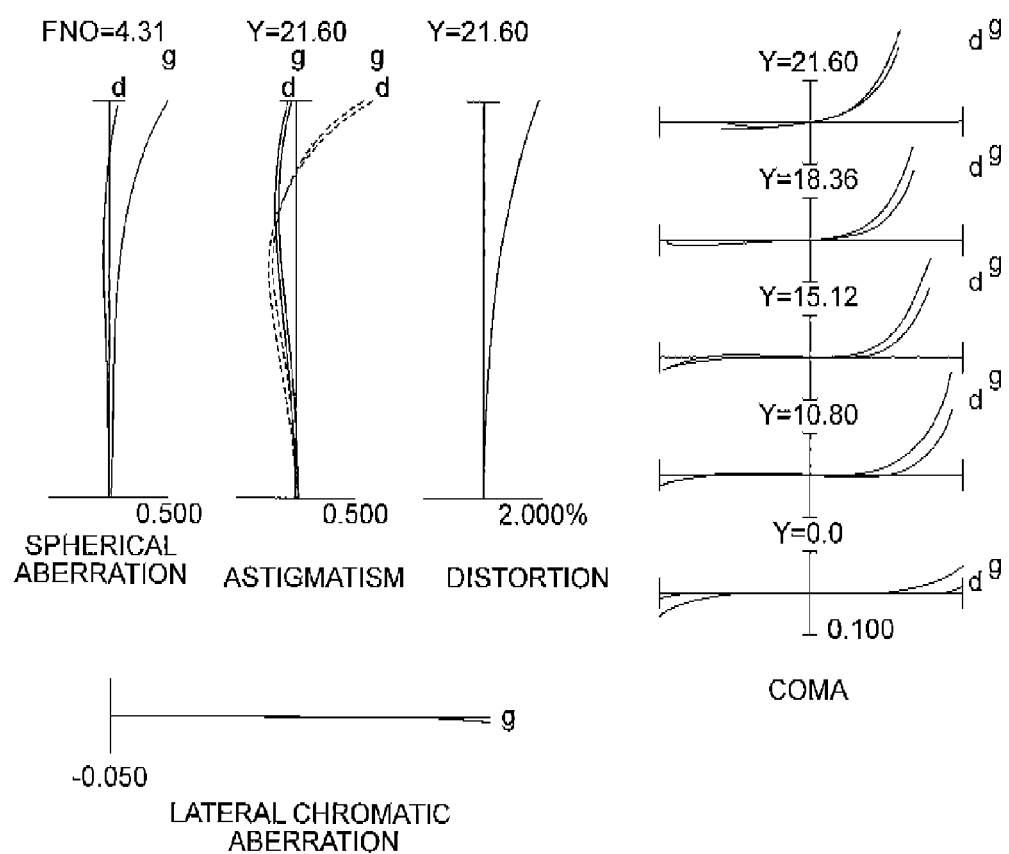
FIG. 11 is a diagram of the aberration in the infinite-distance focusing state in the intermediate focal length state according to Example 3.
Figure 12A:
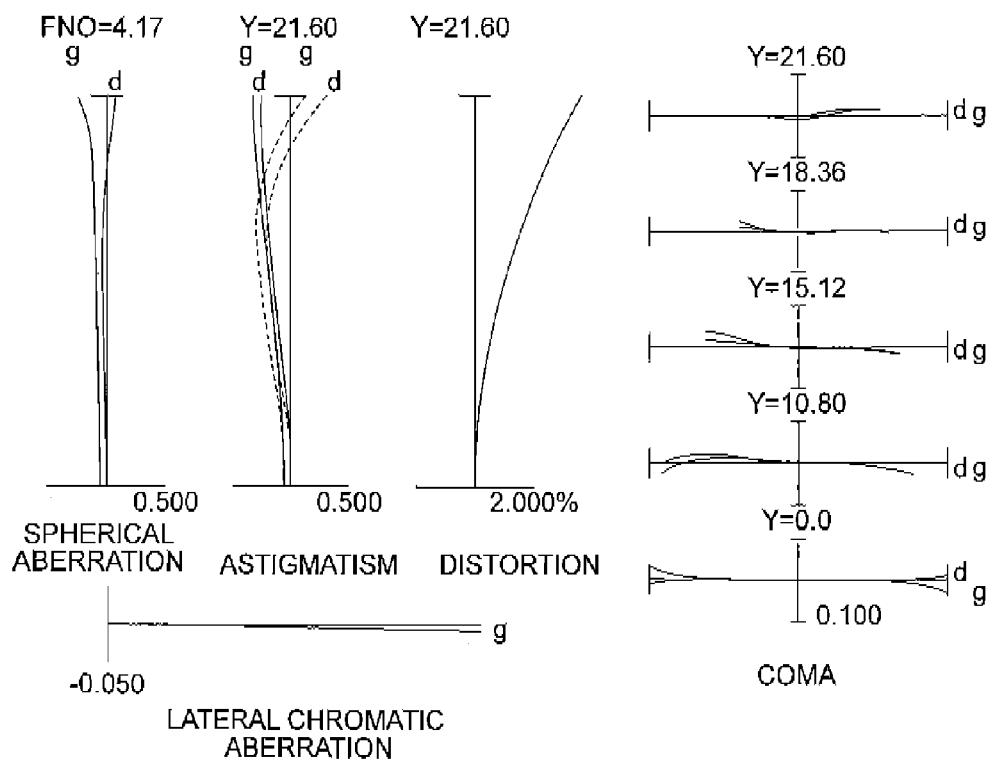
FIGS. 12A and 12B are diagrams of the various aberrations in the infinite-distance focusing state according to Example 3.
Figure 12B:
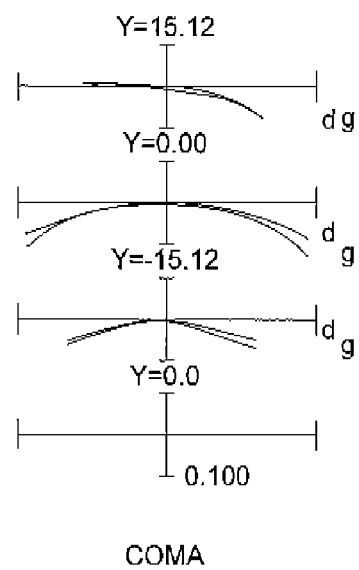

FIGS. 10A and 10B are diagrams of the various aberrations in the infinite-distance focusing state according to Example 3; FIG. 10A is the diagram of the various aberrations in the wide-angle end state; FIG. 10B is a diagram of coma when correcting the rotational vibration through 0.66° in the infinite-distance photographing state in the wide-angle end state. FIG. 11 is a diagram of the aberration in the infinite-distance focusing state in the intermediate focal length state according to Example 3. FIGS. 12A and 12B are diagrams of the various aberrations in the infinite-distance focusing state according to Example 3; FIG. 12A is the diagram of the various aberrations in the telephoto end state; FIG. 12B is a diagram of coma when correcting the rotational vibration through 0.19° in the infinite-distance photographing state in the telephoto end state.

As is apparent from the respective graphs, the zoom optical system according to Example 3 shows superb optical performance as a result of good corrections to various aberrations in each focal length state from the wide-angle end state through the telephoto end state.

Example 4

Figure 13:
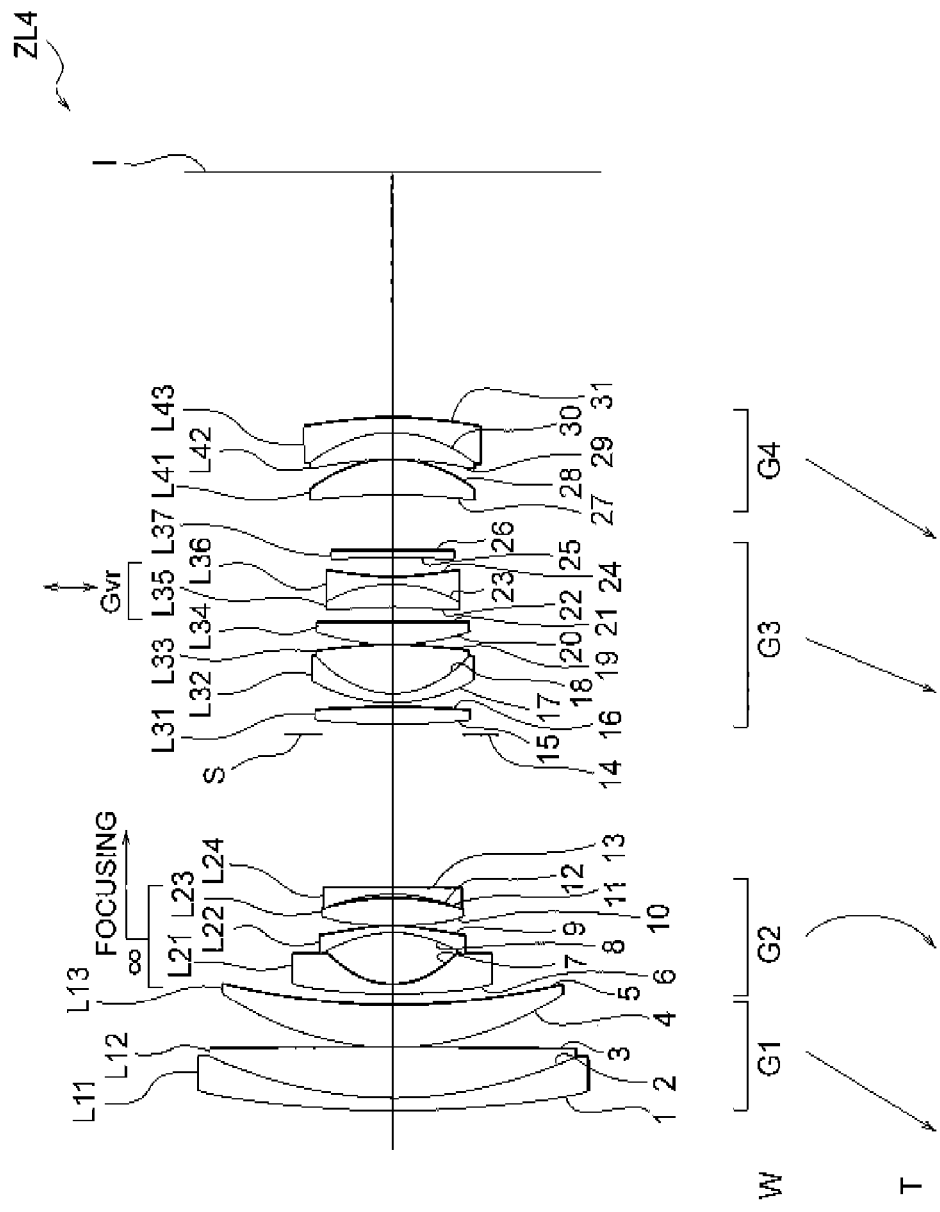
FIG. 13 is a sectional view showing a configuration of the zoom optical system according to Example 4.

FIG. 13 is a view showing a configuration of a zoom optical system ZL4 according to Example 4. In the zoom optical system ZL4 in FIG. 13, the first lens group G1 is composed of, in order from the object side, a cemented lens constructed by a negative meniscus lens L11 with a convex surface directed to the object side cemented with a biconvex lens L12, and a positive meniscus lens L13 with a convex surface directed to the object side. The second lens group G2 is composed of, in order from the object side, a negative meniscus lens L21 with a convex surface directed to the object side, a negative meniscus lens L22 with a concave surface directed to the object side, a biconvex lens L23 and a biconcave lens L24, in which the negative meniscus lens L21 positioned closest to the object side of the second lens group G2 is an aspherical lens of which the object-sided glass lens surface is formed with an aspherical surface, and the negative meniscus lens L24 positioned closest to the image side is an aspherical lens of which the image-sided glass lens surface is formed with an aspherical surface. The third lens group G3 is composed of, in order from the object side, a biconvex lens L31, a cemented lens constructed by a negative meniscus lens L32 with a concave surface directed to the image side cemented with a biconvex lens L33, a positive meniscus lens L34 with a convex surface directed to the object side, a cemented lens (the movable lens group Gvr) constructed by a positive meniscus lens L35 with a convex surface directed to the image side cemented with a biconcave lens L36, and a negative meniscus lens L37 with a concave surface directed to the object side. The fourth lens group G4 is composed of, in order from the object side, a positive meniscus lens L41 with a convex surface directed to the image side, and a cemented lens constructed by a positive meniscus lens L42 with a convex surface directed to the image side cemented with a negative meniscus lens L44 with a convex surface directed to the image side, in which the biconvex lens L41 positioned closest to the object side of the fourth lens group G4 is an aspherical lens of which the object-sided glass lens surface is formed with an aspherical surface.

In the wide-angle end state according to Example 4, the vibration reduction coefficient is 1.00, and the focal length is 25.1 (mm), so that the shift quantity of the movable lens group Gvr for correcting the rotational vibration through 0.68° is 0.3 (mm). In the telephoto end state according to Example 4, the vibration reduction coefficient is 1.55, and the focal length is 126.2 (mm), so that the shift quantity of the movable lens group Gvr for correcting the rotational vibration through 0.21° is 0.3 (mm).

The following table 4 shows the various items of data according to Example 4.

TABLE 4

[Specifications]

| | W | M | T |
|---|---|---|---|
| f = | 25.1 | 49.0 | 126.2 |
| FNO = | 4.1 | 4.3 | 4.3 |
| 2ω = | 84.3 | 46.0 | 18.7 |

TABLE 4-continued

| TL = | 144.4 | 161.4 | 191.3 |
|---|---|---|---|
| Bf = | 38.5 | 55.4 | 72.8 |

[Lens Data]

| i | r | d | vd | nd |
|---|---|---|---|---|
| 1 | 193.0235 | 2.0 | 23.77 | 1.84666 |
| 2 | 83.8012 | 7.5 | 67.87 | 1.59318 |
| 3 | −963.4411 | 0.1 | | |
| 4 | 55.7667 | 6.3 | 52.29 | 1.75500 |
| 5 | 141.2394 | (d5) | | |
| *6 | 190.7683 | 1.2 | 46.63 | 1.81600 |
| 7 | 14.0880 | 8.0 | | |
| 8 | −22.9439 | 1.0 | 45.30 | 1.79500 |
| 9 | −41.9612 | 0.10 | | |
| 10 | 49.9757 | 4.2 | 23.77 | 1.84666 |
| 11 | −35.3487 | 0.5 | | |
| 12 | −28.1383 | 1.0 | 40.94 | 1.80610 |
| 13* | 1638.3373 | (d13) | | |
| 14 | 0.0000 | 1.4 | Aperture Stop S | |
| 15 | 166.9279 | 2.6 | 52.29 | 1.75500 |
| 16 | −127.4741 | 0.5 | | |
| 17 | 25.9521 | 1.5 | 23.77 | 1.84666 |
| 18 | 16.6040 | 7.5 | 70.45 | 1.48749 |
| 19 | −80.1801 | 0.1 | | |
| 20 | 39.1993 | 3.4 | 67.87 | 1.59318 |
| 21 | 4775.8297 | 2.5 | | |
| 22 | −87.5191 | 3.5 | 32.35 | 1.85026 |
| 23 | −23.6805 | 1.0 | 52.29 | 1.75500 |
| 24 | 53.2830 | 3.0 | | |
| 25 | −176.2204 | 1.0 | 53.89 | 1.71300 |
| 26 | −943.5176 | (d26) | | |
| 27* | 739.6640 | 5.7 | 61.18 | 1.58913 |
| 28 | −21.1537 | 0.1 | | |
| 29 | −53.7866 | 4.0 | 70.45 | 1.48749 |
| 30 | −21.3293 | 2.0 | 32.35 | 1.85026 |
| 31 | −73.8800 | (Bf) | | |

[Aspherical Data]

Surface Number: 6

κ = 1.0000
A4 = 1.32270E−05
A6 = −3.14110E−08
A8 = 4.74440E−11
A10 = −3.43860E−14
A12 = 0.00000E+00

Surface Number: 13

κ = 1.0000
A4 = −3.02320E−06
A6 = −1.73280E−08
A8 = 8.52640E−12
A10 = −8.74630E−14
A12 = 0.00000E+00

Surface Number: 27

κ = −30.0000
A4 = −1.97540E−05
A6 = −1.56180E−08
A8 = 4.19740E−11
A10 = −1.12730E−13
A12 = 0.00000E+00

[Variable Distances upon Zooming]

| | W | M | T |
|---|---|---|---|
| f = | 25.1 | 49.0 | 126.2 |
| d5 = | 2.0 | 20.4 | 44.5 |
| d13 = | 23.6 | 11.7 | 0.8 |
| d26 = | 8.3 | 2.0 | 1.3 |
| Bf = | 38.5 | 55.4 | 72.8 |
| TL = | 144.4 | 161.4 | 191.3 |

TABLE 4-continued

[Lens Group Data]

| Group | I | Focal Length |
|---|---|---|
| 1 | 1 | 96.4 |
| 2 | 6 | −17.2 |
| 3 | 15 | 38.4 |
| 4 | 27 | 69.8 |

[Values for Conditional Expressions]

fvr = −49.8
φ3 = 23.4
(1) φ3/f3 = 0.61
(2) f1/(−f2) = 5.59
(3) φ3/Bfw = 0.61
(4) |fvr|/ft = 0.39
(5) f4/f3 = 1.82

Figure 14A:
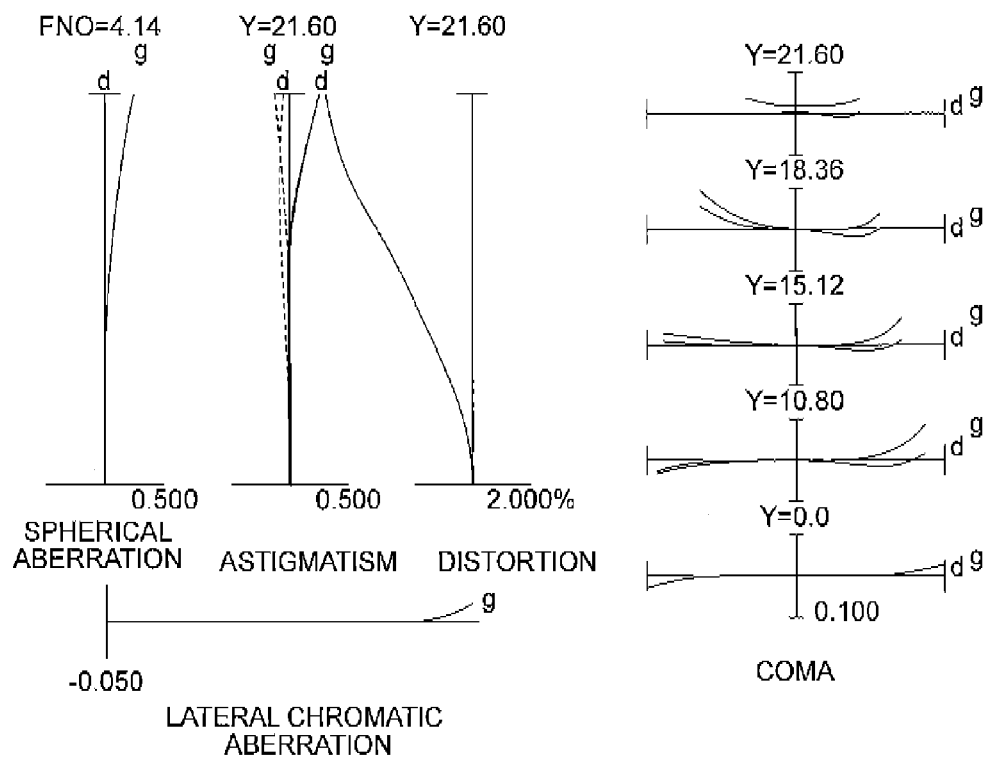
FIGS. 14A and 14B are diagrams of the various aberrations in the infinite-distance focusing state according to Example 4.
Figure 14B:
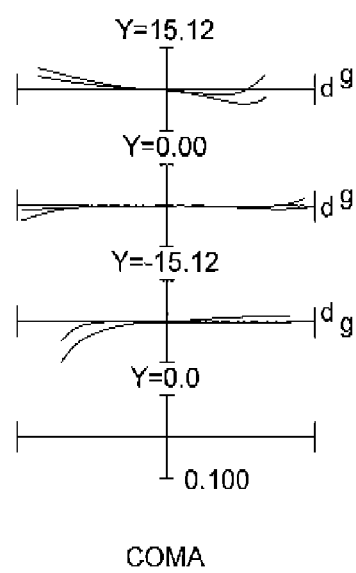
Figure 15:
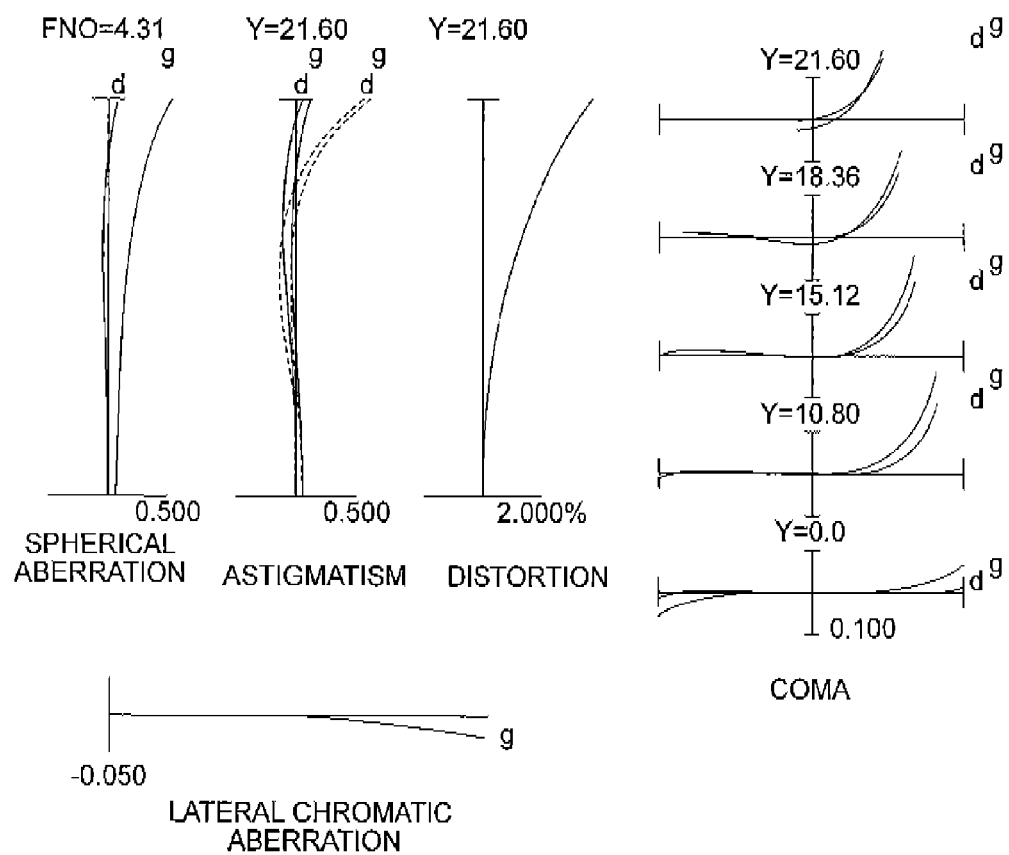
FIG. 15 is a diagram of the aberration in the infinite-distance focusing state in the intermediate focal length state according to Example 4.
Figure 16A:
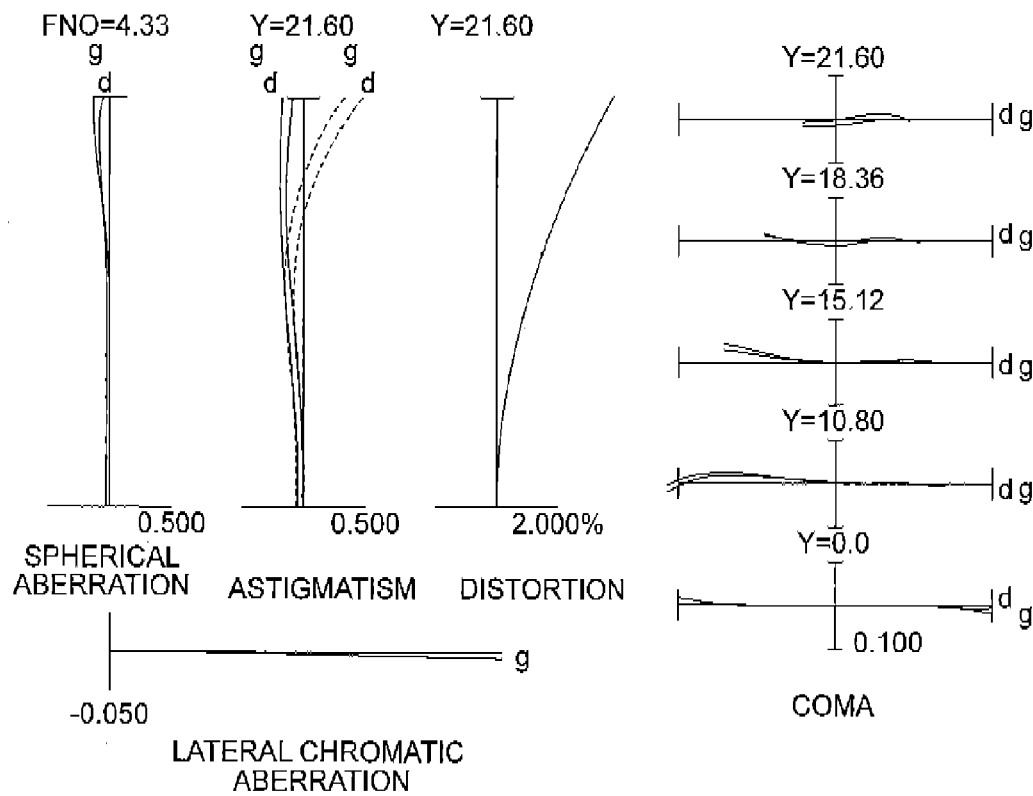
FIGS. 16A and 16B are diagrams of the various aberrations in the infinite-distance focusing state according to Example 4.
Figure 16B:
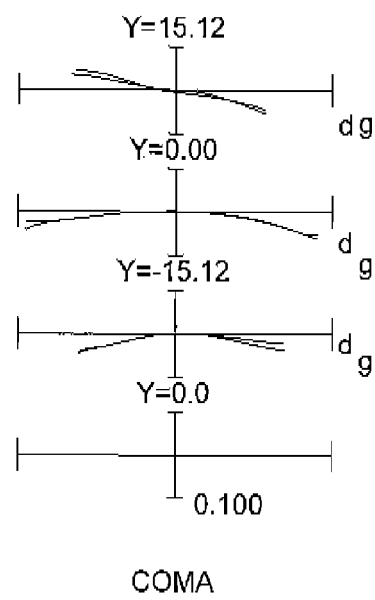

FIGS. 14A and 14B are diagrams of the various aberrations in the infinite-distance focusing state according to Example 4; FIG. 14A is the diagram of the various aberrations in the wide-angle end state; FIG. 14B is a diagram of coma when correcting the rotational vibration through 0.68° in the infinite-distance photographing state in the wide-angle end state. FIG. 15 is a diagram of the aberration in the infinite-distance focusing state in the intermediate focal length state according to Example 4. FIGS. 16A and 16B are diagrams of the various aberrations in the infinite-distance focusing state according to Example 4; FIG. 16A is the diagram of the various aberrations in the telephoto end state; FIG. 16B is a diagram of coma when correcting the rotational vibration through 0.21° in the infinite-distance photographing state in the telephoto end state.

As is apparent from the respective graphs, the zoom optical system according to Example 4 shows superb optical performance as a result of good corrections to various aberrations in each focal length state from the wide-angle end state through the telephoto end state.

What is claimed is:

1. A zoom optical system comprising, in order from an object side;
   a first lens group having positive refractive power;
   a second lens group having negative refractive power;
   a third lens group having positive refractive power; and
   a fourth lens group having positive refractive power;
   at least a portion of lenses within said third lens group composing a movable lens group which moves in a direction having a component perpendicular to an optical axis,
   upon zooming from a wide-angle end state to a telescopic end state, a distance between said first lens group and said second lens group, a distance between said second lens group and said third lens group and a distance between said third lens group and said fourth lens group being variable, and
   the following conditional expressions being satisfied;

$0.47 < \phi3/f3 < 1.00$ $4.50 < f1/(-f2) < 8.50$ where φ3 denotes a light beam effective diameter of lens surface positioned closest to the object side of said third lens group, f1 denotes a focal length of said first lens group, f2 denotes a focal length of said second lens group, and f3 denotes a focal length of said third lens group.

2. The zoom optical system according to claim 1, wherein the following conditional expression is satisfied:

$0.50 < \phi3/Bfw < 1.00$ where Bfw denotes a back focal length of the zoom optical system in the wide-angle end state.

3. The zoom optical system according to claim 1, wherein a cemented lens is included within said third lens group.

4. The zoom optical system according to claim 1, wherein an aspherical lens is provided within said second lens group.

5. The zoom optical system according to claim 1, wherein the following conditional expression is satisfied:

$0.20 < |fvr|/ft < 0.70$ where fvr denotes a focal length of said movable lens group, and ft denotes a focal length of the zoom optical system in the telescopic end state.

6. The zoom optical system according to claim 1, wherein said movable lens group includes a cemented lens.

7. The zoom optical system according to claim 1, wherein said movable lens group is disposed closest to an image side of said third lens group.

8. The zoom optical system according to claim 1, wherein said third lens group includes at least one lens on the image side of said movable lens group.

9. The zoom optical system according to claim 1, wherein said movable lens group has negative refractive power.

10. The zoom optical system according to claim 1, wherein the following conditional expression is satisfied:

$1.00 < f4/f3 < 4.00$ where f3 denotes a focal length of said third lens group, and f4 denotes a focal length of said fourth lens group.

11. The zoom optical system according to claim 1, wherein an aspherical lens is provided within said fourth lens group.

12. The zoom optical system according to claim 1, wherein a cemented lens constructed by, in order from the object side, a positive lens cemented with a negative lens is provided within said fourth lens group.

13. The zoom optical system according to claim 1, wherein an aperture stop is disposed between the second lens group and the third lens group.

14. The zoom optical system according to claim 1, wherein an aperture stop is moved together with the third lens group upon zooming from the wide-angle end state to the telephoto end state.

15. The zoom optical system according to claim 1, wherein the third lens group includes two cemented lenses.

16. The zoom optical system according to claim 1, wherein the most object side lens in the third lens group is a single lens.

17. An optical apparatus including said zoom optical system according to claim 1.

18. A zoom optical system comprising, in order from an object side;
   a first lens group having positive refractive power;
   a second lens group having negative refractive power;
   a third lens group having positive refractive power; and
   a fourth lens group having positive refractive power;
   at least a portion of lenses within said third lens group composing a movable lens group which moves in a direction having a component perpendicular to an optical axis,
   upon zooming from a wide-angle end state to a telescopic end state, a distance between said first lens group and said second lens group, a distance between said second lens group and said third lens group and a distance between said third lens group and said fourth lens group being variable, and
   the following conditional expressions being satisfied:

$0.50 < \phi3/Bfw < 0.85$ $4.50 < f1/(-f2) < 8.50$ when φ3 denotes a light beam effective diameter of a lens surface positioned closest to the object side of said third lens group, f1 denotes a focal length of said first lens group, f2 denotes a focal length of said second lens group, and Bfw denotes a back focal length of the zoom optical system in the wide-angle end state.

19. A method for manufacturing a zoom optical system comprising, in order from an object side, a first lens group, a second lens group, a third lens group, and a fourth lens group; the method comprising steps of:

disposing at least a portion of lenses composing a movable lens group which moves in a direction having a component perpendicular to an optical axis into said third lens group;

varying a distance between said first lens group and said second lens group, a distance between said second lens group and said third lens group and a distance between said third lens group and said fourth lens group upon zooming from a wide-angle end state to a telescopic end state; and disposing the first lens group having positive refractive power, the second lens group having negative refractive power, a third lens group having positive refractive power and a fourth lens group having positive refractive power with satisfying the following conditional expressions:

$$0.47 < \phi 3/f3 < 1.00$$

$$4.50 < f1/(-f2) < 8.50$$

when $\phi 3$ denotes a light beam effective diameter of a lens surface positioned closest to the object side of said third lens group, f1 denotes a focal length of said first lens group, f2 denotes a focal length of said second lens group, and f3 denotes a focal length of said third lens group.

20. The method according to claim 19, further comprising a step of satisfying the following conditional expression:

$$0.50 < \phi 3/Bfw < 1.00$$

where Bfw denotes a back focal length of the zoom optical system in the wide-angle end state.

21. The method according to claim 19, further comprising a step of:

satisfying the following conditional expression:

$$0.20 < |fvr|/ft < 0.70$$

where fvr denotes a focal length of said movable lens group, and ft denotes a focal length of the zoom optical system in the telescopic end state.

22. The method according to claim 19, further comprising a step of:

disposing said movable lens group including a cemented lens.

23. The method according to claim 19, further comprising a step of;

satisfying the following conditional expression:

$$1.00 < f4/f3 < 4.00$$

where f3 denotes a focal length of said third lens group, and f4 denotes a focal length of said fourth lens group.

24. A method for manufacturing a zoom optical system comprising, in order from an object side, a first lens group, a second lens group, a third lens group, and a fourth lens group; the method comprising steps of:

disposing at least a portion of lenses composing a movable lens group which moves in a direction having a component perpendicular to an optical axis into said third lens group;

varying a distance between said first lens group and said second lens group, a distance between said second lens group and said third lens group and a distance between said third lens group and said fourth lens group upon zooming from a wide-angle end state to a telescopic end state; and disposing the first lens group having positive refractive power, the second lens group having negative refractive power, a third lens group having positive refractive power and a fourth lens group having positive refractive power with satisfying the following conditional expressions:

$$0.50 < \phi 3/Bfw < 0.85$$

$$4.50 < f1/(-f2) < 8.50$$

when $\phi 3$ denotes a light beam effective diameter of a lens surface positioned closest to the object side of said third lens group, f1 denotes a focal length of said first lens group, f2 denotes a focal length of said second lens group, and Bfw denotes a back focal length of the zoom optical system in the wide-angle end state.

\* \* \* \* \*